(12) United States Patent
Bowling et al.

(10) Patent No.: US 11,027,432 B2
(45) Date of Patent: Jun. 8, 2021

(54) TECHNIQUES FOR CONTROLLING POSITION OF AN END EFFECTOR OF A ROBOTIC DEVICE RELATIVE TO A VIRTUAL CONSTRAINT

(71) Applicant: Stryker Corporation, Kalamazoo, MI (US)

(72) Inventors: David Gene Bowling, Los Ranchos De Albuquerque, NM (US); Timothy J. Bozung, Scotts, MI (US)

(73) Assignee: Stryker Corporation, Kalamazoo, MI (US)

( * ) Notice: Subject to any disclaimer, the term of this patent is extended or adjusted under 35 U.S.C. 154(b) by 323 days.

(21) Appl. No.: 16/122,201

(22) Filed: Sep. 5, 2018

(65) Prior Publication Data

US 2019/0070731 A1 Mar. 7, 2019

Related U.S. Application Data

(60) Provisional application No. 62/554,755, filed on Sep. 6, 2017.

(51) Int. Cl.
*G06F 17/00* (2019.01)
*B25J 9/16* (2006.01)
*B25J 17/02* (2006.01)

(52) U.S. Cl.
CPC ........... *B25J 9/1694* (2013.01); *B25J 9/1666* (2013.01); *B25J 9/1692* (2013.01); *B25J 17/0283* (2013.01)

(58) Field of Classification Search
CPC ...... B25J 9/1694; B25J 9/1666; B25J 9/1692; B25J 17/0283

(Continued)

(56) References Cited

U.S. PATENT DOCUMENTS 7,626,569 B2 * 12/2009 Lanier .................. G06F 1/1601
345/156
9,008,757 B2 4/2015 Wu
(Continued)

OTHER PUBLICATIONS

Becker, B.C. et al., "Active Guidance of a Handheld Micromanipulator Using Visual Servoing", IEEE International Conference on Robotics and Automation, vol. 2009, 2009, pp. 229-344, http://www.pubmedcentral.nih.gov/articlerender.fcgi? . . . .

(Continued)

*Primary Examiner* — Ronnie M Mancho
(74) *Attorney, Agent, or Firm* — Howard & Howard Attorneys PLLC

(57) ABSTRACT

A robotic device includes one or more joints to position an end effector in a plurality of degrees of freedom. A navigation system tracks an actual position of the end effector. One or more controllers identify a condition wherein the actual position of the end effector contacts a virtual constraint. An anticipated movement of the end effector is evaluated from the actual position to a home position of the end effector. The one or more controllers detect an anticipated collision between the end effector and the virtual constraint and compute a target position of the end effector that evades the anticipated collision. The target position is spaced from the actual position and also contacts the virtual constraint. The one or more joints are controlled to slide the end effector from the actual position to target position along the virtual constraint.

21 Claims, 19 Drawing Sheets

(58) Field of Classification Search
USPC .......................................................... 700/260
See application file for complete search history.

(56) References Cited

U.S. PATENT DOCUMENTS

| | | | |
|---|---|---|---|
| 9,119,655 B2 | 9/2015 | Bowling et al. | |
| 2012/0330429 A1 | 12/2012 | Axelson, Jr. et al. | |
| 2013/0060278 A1 | 3/2013 | Bozung et al. | |
| 2014/0058406 A1* | 2/2014 | Tsekos | A61B 34/30 606/130 |
| 2014/0276949 A1 | 9/2014 | Staunton et al. | |
| 2014/0320392 A1* | 10/2014 | Chizeck | G06F 3/016 345/156 |
| 2015/0320514 A1* | 11/2015 | Ahn | A61B 34/30 606/130 |
| 2016/0278754 A1* | 9/2016 | Todorov | A61F 2/3859 |
| 2017/0157361 A1* | 6/2017 | Barrish | A61B 34/20 |

OTHER PUBLICATIONS

Brisson, G. et al., "Precision Freehand Sculpting of Bone", Medical Image Computing and Computer-Assisted Intervention, 2004, pp. 105-112, http://www.springerlink.com/index/qfw0gd60myc9geq5.pdf . . . , 1 page.

Gilbertson, M.W. et al., "Abstract of Force and Position Control System for Freehand Ultrasound", IEEE Transactions on Robotics, vol. 31, No. 4, 2015, http://ieeexplore.ieee.org/lpdocs/epic03/wrapper.htm?arnumber=7123185, 1 page.

Klemm, M. et al., "Abstract of Flexible Three-Dimensional Camera-Based Reconstruction and Calibration of Tracked Instruments", 19th International Conference on Information Fusion (FUSION), 2016, 1 page.

Kneissler, M. et al., "Abstract of Concept and Clinical Evaluation of Navigated Control in Spine Surgery", IEEE/ASME International Conference on Advanced Intelligent Mechatronis, AIM, vol. 2, 2003, 1 page.

Lang, J.E. et al., "Robotic Systems in Orthopaedic Surgery", Bone & Joint Journal, vol. 93-B, No. 10, 2011, pp. 1296-1922, http://bjj.boneandjoint.org.uk/content/93-B/10/1296.

Lonner, J.H. et al., "Abstract of Robotically Assisted Unicompartimental Knee Arthroplasty with a Handheld Image-Free Sculpting Tool", 2016, 1 page.

Pereira, R. et al., "Abstract of Hand-Held Robotic Device for Laparoscopic Surgery and Training", IEEE, 3rd International Conference on Serious Games and Applications for Health, Books of Proceedings, 2014, 1 page.

Shi, J. et al., "Abstract of Accuracy Study of a New Assistance System Under the Application of Navigated Control for Manual Milling on a Head Phantom", Conference Proceedings, Annual International Conference of the IEEE Engineering in Medicine and Biology Society, vol. 2010, 2010, pp. 2296-2299; http://www.ncbi.nlm.nih.gov/pubmed/21097019, 1 page.

U.S. Appl. No. 15/952,810, filed Apr. 13, 2018.

* cited by examiner

TECHNIQUES FOR CONTROLLING POSITION OF AN END EFFECTOR OF A ROBOTIC DEVICE RELATIVE TO A VIRTUAL CONSTRAINT

CROSS-REFERENCE TO RELATED APPLICATIONS

The subject application claims priority to and all the benefits of U.S. provisional patent application Ser. No. 62/554,755, filed Sep. 6, 2017, the contents of which are hereby incorporated by reference in its entirety.

TECHNICAL FIELD

The disclosure relates to techniques for iterative and rule-based position control of an end effector of a robotic system, and more particularly, to address complex situations where the end effector encounters virtual constraints.

BACKGROUND

In recent years, robotic systems have become an integral part of many orthopaedic surgeries. Higher accuracy, reproducibility and the ability to execute complex milling procedures are just some of the advantages of robotic systems. On the one hand, they perform milling procedures automatically and increase the final accuracy. On the other hand, they can produce increasing costs and consume additional training time since the surgical workflow has to be adapted to the robot. Therefore, such systems are suitable for interventions that are performed frequently and that need minimal interaction by the surgeon.

Certain robotic devices have to consider the human dynamics (human-in-the-loop control). The frequency of the on/off switching of the tool power may present problems. Moreover, prior techniques are not successful in controlling the end effector with respect to arbitrarily shaped constraints, such as a surface and not a closed volume. For example, in prior techniques, when the end effector is constrained by a surface, the end effector may stick to the virtual constraint for an extended period of time until the robotic device is moved a sufficient distance away from the constraint. This problem limits range of tool movement relative to constraints, and hence, decreases smoothness of tool control and user experience. Accordingly, there is a need to address at least the aforementioned issues.

SUMMARY

This Summary introduces a selection of concepts in a simplified form that are further described below in the Detailed Description below. This Summary is not intended to limit the scope of the claimed subject matter nor identify key features or essential features of the claimed subject matter.

One example of a system is disclosed. The system includes a robotic device comprising an end effector and one or more joints to position the end effector in a plurality of degrees of freedom. A navigation system is configured to track an actual position of the end effector. One or more controllers are configured to identify a condition wherein the actual position of the end effector contacts a virtual constraint. A home position of the end effector is determined. The home position is a position the end effector would be located without regard to the virtual constraint. The one or more controllers evaluate an anticipated movement of the end effector from the actual position to the home position and detect that the anticipated movement would cause an anticipated collision between the end effector and the virtual constraint. The one or more controllers compute a target position of the end effector that evades the anticipated collision. The target position is spaced apart from the actual position and also contacts the virtual constraint. The one or more joints of the robotic device slide the end effector from the actual position to target position along the virtual constraint.

One example of a method of operating a system is disclosed. The system includes a robotic device including an end effector and one or more joints to position the end effector in a plurality of degrees of freedom, a navigation system configured to track an actual position of the end effector, and one or more controllers. The method comprises the one or more controllers configured to perform the steps of identifying a condition wherein the actual position of the end effector contacts a virtual constraint. A home position of the end effector is determined. The home position is a position the end effector would be located without regard to the virtual constraint. The one or more controllers evaluate an anticipated movement of the end effector from the actual position to the home position and detect that the anticipated movement would cause an anticipated collision between the end effector and the virtual constraint. The one or more controllers compute a target position of the end effector that evades the anticipated collision. The target position is spaced apart from the actual position and also contacts the virtual constraint. The one or more joints of the robotic device slide the end effector from the actual position to target position along the virtual constraint.

One example of a controller-implemented method is disclosed wherein the method is for controlling an end effector in a situation wherein an actual position of the end effector contacts a virtual constraint. The method comprises computing a target position of the end effector that is spaced apart from the actual position and also contacts the virtual constraint. The method comprises moving the end effector from the actual position to target position along the virtual constraint.

Technical solutions provided by the disclosure include addressing complex situations where the end effector encounters virtual constraints. In order to prevent the end effector from sticking on the virtual constraint after contact, the techniques define the target position to enable the end effector to slide along the constraint thereby evading any further collisions and allowing continued tool movement. This solution expands range of tool movement relative to constraints, and hence, increases smoothness of tool control and user experience. Also, using a position-controlled robotic device over a speed-controlled milling device results in smoother surfaces and a faster execution. The technical solutions can be realized for hand-held robotic devices as well as larger robotic systems.

The systems, methods, and techniques may exhibit advantages and provide technical solutions other than those described herein.

BRIEF DESCRIPTION OF THE DRAWINGS

Other aspects, features, and advantages of the present invention will become more fully apparent from the detailed description, the appended claims, and the accompanying drawings wherein like reference numerals identify similar or identical elements.

DETAILED DESCRIPTION

Described herein are iterative and rule-based position techniques for controlling a robotic device (RD) to address complex situations where an end effector 20 of the robotic device (RD) encounters virtual constraints (VC).

Figure 1A:
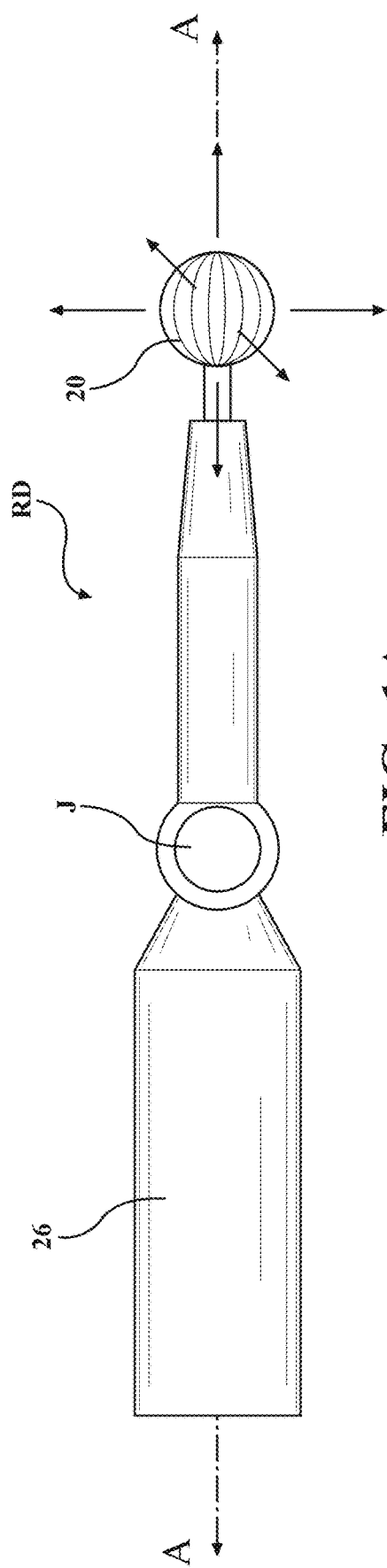
FIG. 1A is a side view of an example of a handheld robotic device with three degrees of freedom and a milling end effector.

In one example, as shown in FIG. 1A, the robotic device (RD) is a handheld robotic device (RD). When the robotic device (RD) is handheld, the operator physically holds the robotic device (RD) and the operator supports the entire weight of the robotic device (RD). Control of the robotic device (RD) in this example takes into account the dexterity of the operator. Examples of handheld versions of the robotic device (RD) used in medical fields may include force and position controlled handheld ultrasound devices, micromanipulators and laparoscopic surgery and navigated bone milling tools used in orthopaedic surgery.

When the robotic device (RD) is handheld, it can be similar to that shown in U.S. Patent Application Publication No. 2013/0060278, entitled, "Surgical Instrument Including Housing, a Cutting Accessory that Extends from the Housing and Actuators that Establish the Position of the Cutting Accessory Relative to the Housing", and similar to that shown in U.S. Patent Application Publication No. 2014/0276949, filed on Mar. 15, 2014, entitled, "End Effector of a Surgical Robotic Manipulator," the disclosures of which are hereby incorporated by reference.

The robotic device (RD) comprises an end effector 20. In many examples descried herein, the end effector 20 is a substantially spherically shaped burr. However, the end effector 20 can have other configurations, such as a drill, drill guide, saw blade, saw blade guide, screw driver, or the like. The end effector 20 can be dynamically relocated using one or several joints (J) integrated with the robotic device (20).

Figure 1B:
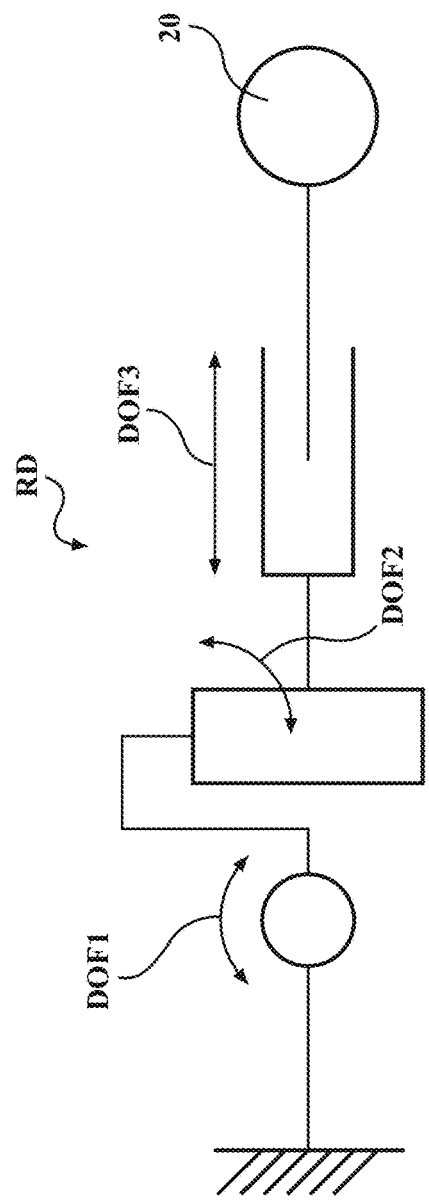
FIG. 1B is a diagram illustrating three degrees of freedom of the handheld robotic device of FIG. 1A.

In FIG. 1B, a schematic representation of the robotic device (RD) of FIG. 1A is illustrated. The robotic device (RD) is grounded either by the body of the operator standing on the floor, or by a stationary cart on to which the robotic device (RD) is attached. In this example, the robotic device (RD) comprises two rotational degrees of freedom and one translational degree of freedom. Thus, the robotic device (RD) comprises three degrees of freedom in FIGS. 1A and 1B. The robotic device (RD) can have any number of degrees of freedom greater than or equal to three. Moreover, any type of joints (J) can be utilized, including translational, rotational, or the like. When the robotic device (RD) is handheld, the joint(s) (J) are located between the end effector 20 and a handle 26 of the robotic device (RD).

In other examples, the robotic device (RD) can be a larger robotic manipulator that has a base and plurality of links. A manipulator cart supports the manipulator such that the manipulator is fixed to the manipulator cart. The links collectively form one or more arms of the manipulator. The end effector 20 is attached to a distal end of the arm. The manipulator may have a serial arm configuration, a parallel arm configuration, or any other suitable manipulator configuration. In other examples, more than one manipulator may be utilized in a multiple arm configuration. One example of using this version of the robotic device (RD) is described in U.S. application Ser. No. 16/000,498, entitled "Robotic Surgical System And Method For Producing Reactive Forces To Implement Virtual Boundaries", the entire disclosure of which is hereby incorporated by reference in its entirety.

The robotic device (RD) is movable relative to the patient (P) to interact with the anatomy in certain modes. Examples of these modes are described in U.S. Pat. No. 9,119,655, entitled, "Surgical Manipulator Capable of Controlling a Surgical Instrument in Multiple Modes," the disclosure of which is hereby incorporated by reference.

Figure 2:
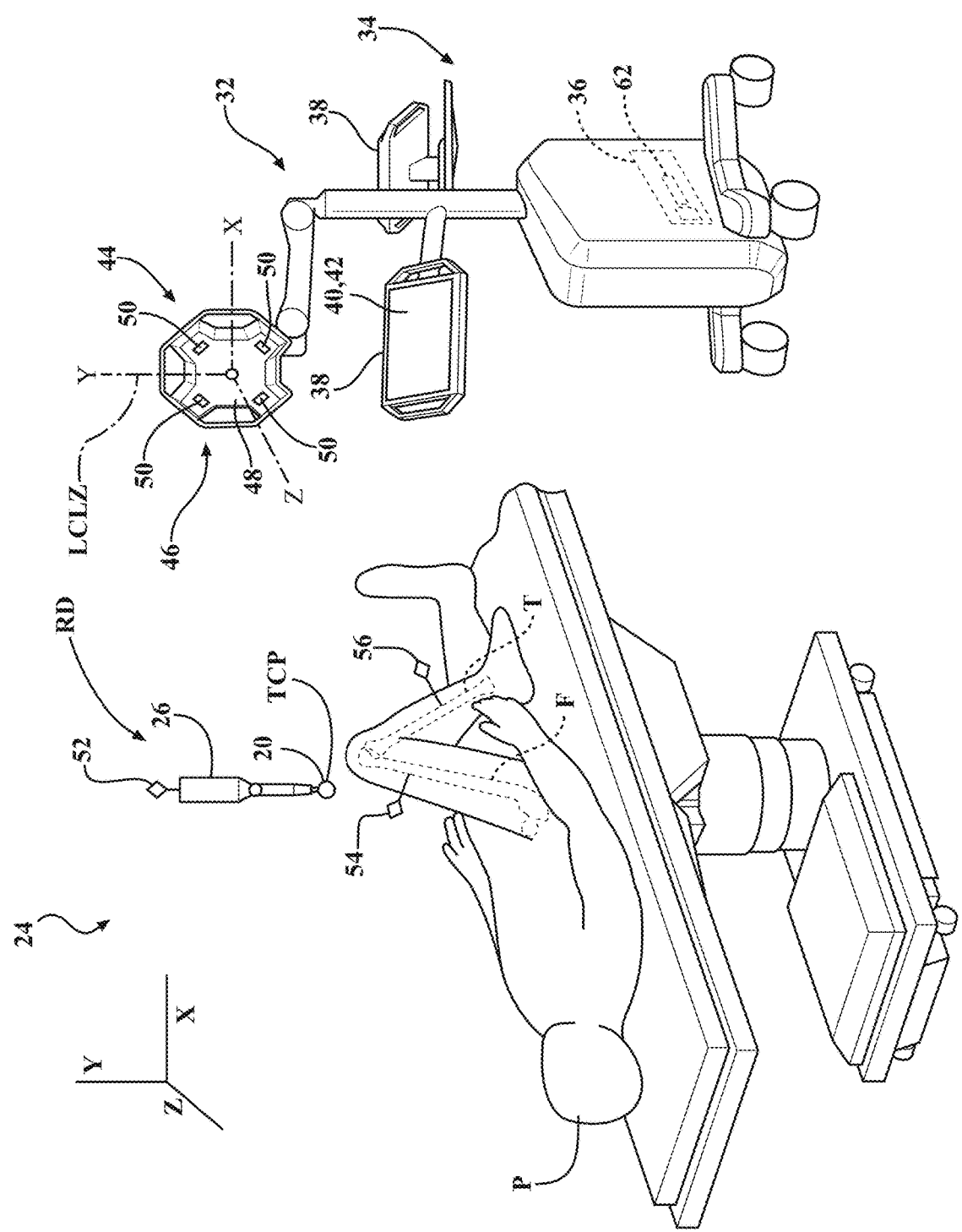
FIG. 2 is a perspective view of an example system for treating an anatomy of a patient.

In FIG. 2, a system 24 that can employ the robotic device (RD) and the control techniques described herein is shown for treating an anatomy of a patient (P), such as bone or soft tissue. In FIG. 2, the patient (P) is undergoing a surgical procedure. The anatomy in FIG. 2 includes a femur (F) and a tibia (T) of the patient (P). The surgical procedure may involve tissue removal or treatment. Treatment may include cutting, coagulating, lesioning the tissue, treatment in place of tissue, or the like. In some examples, the surgical procedure involves partial or total knee or hip replacement surgery. The system 24 can be designed to cut away material to be replaced by surgical implants such as hip and knee implants, including unicompartmental, bicompartmental, multicompartmental, or total knee implants. Some of these types of implants are shown in U.S. Patent Application Publication No. 2012/0330429, entitled, "Prosthetic implant and Method of Implantation," the disclosure of which is hereby incorporated by reference. The system 24 and methods disclosed herein may be used to perform other procedures, surgical or non-surgical, or may be used in industrial applications or other applications where robotic systems are utilized.

The end effector 20 may comprise a TCP, which in one example, is a predetermined reference point. The TCP has known position in its own coordinate system. In one example, the TCP is assumed to be located at the center of a spherical feature of the end effector 20 such that only one point is tracked. The TCP may relate to a burr having a specified diameter, in one example. The TCP may be defined according to various manners other than those described herein.

As shown in FIG. 2, the system 24 further includes a navigation system 32 (sometimes referred to as a "tracking system"). One example of the navigation system 32 is described in U.S. Pat. No. 9,008,757, filed on Sep. 24, 2013, entitled, "Navigation System Including Optical and Non-Optical Sensors," hereby incorporated by reference. The navigation system 32 is configured to track actual positions of various objects. Such objects include, for example, the end effector 20 and the anatomy, e.g., femur F and tibia T. The navigation system 32 tracks these objects to gather state information of each object with respect to a (navigation) localizer coordinate system LCLZ. Coordinates in the localizer coordinate system LCLZ, tool coordinate system, and pointer coordinate system PTR may be transformed to an arbitrary or CAD coordinate system, and/or vice-versa, using any suitable transformation techniques.

The navigation system 32 includes a cart assembly 34 that houses a navigation computer 36, and/or other types of control units. A navigation interface is in operative communication with the navigation computer 36. The navigation interface includes one or more displays 38. The navigation system 32 is capable of displaying a graphical representation of the relative states of the tracked objects to the operator using the one or more displays 38. Input devices 40, 42 may be used to input information into the navigation computer 36 or otherwise to select/control certain aspects of the navigation computer 36. As shown in FIG. 2, such input devices 40, 42 include interactive touchscreen displays. However, the input devices 40, 42 may include any one or more of a keyboard, a mouse, a microphone (voice-activation), gesture control devices, and the like.

The navigation system 32 also includes a navigation localizer 44 (hereinafter "localizer") coupled to the navigation computer 36. In one example, the localizer 44 is an optical localizer and includes a camera unit 46. The camera unit 46 has an outer casing 48 that houses one or more optical sensors 50.

In one example, the navigation system 32 includes one or more trackers. The trackers include one or more tool trackers 52, a first patient tracker 54, and a second patient tracker 56, or the like. In the example of FIG. 2, the tool tracker 52 is coupled to the end effector 20, the first patient tracker 54 is firmly affixed to the femur F of the patient (P), and the second patient tracker 56 is firmly affixed to the tibia T of the patient (P). In this example, the patient trackers 54, 56 are firmly affixed to sections of bone. The trackers 52, 54, 56 may be fixed to their respective components in any suitable manner.

Any one or more of the trackers may include active markers 58. The active markers may include light emitting diodes (LEDs). Alternatively, the trackers 52, 54, 56 may have passive markers, such as reflectors, which reflect light emitted from the camera unit 46. Other suitable markers not specifically described herein may be utilized.

The localizer 44 tracks the trackers 52, 54, 56 to determine a state of each of the trackers 52, 54, 56, which correspond respectively to the state of the object respectively attached thereto. The localizer 44 provides the state of the trackers 52, 54, 56 to the navigation computer 36. In one example, the navigation computer 36 determines and communicates the state of one or more of the trackers 52, 54, 56 to a computing device. As used herein, the state of an object includes, but is not limited to, data that defines the position and/or orientation of the tracked object or equivalents/derivatives of the position and/or orientation. For example, the state may be a pose of the object, and may include linear data, and/or angular velocity data, and the like.

The navigation computer 36 may include a navigation controller 62 for controlling the navigation system 32. The navigation controller 62 may also communicate states of the patient (P) and end effector 20 to the operator by displaying an image of the femur F and/or tibia T, and/or the end effector 20, on the one or more displays 38.

Although one example of the navigation system 32 is shown in the Figures, the navigation system 32 may have any other suitable configuration for tracking the end effector 20 and the patient (P). In one example, the navigation system 32 and/or localizer 44 are ultrasound-based. For example, the navigation system 32 may comprise an ultrasound imaging device coupled to the navigation computer 36. The ultrasound imaging device images any of the aforementioned objects, e.g., the end effector 20, and the patient (P), and generates state signals to the navigation computer 36 based on the ultrasound images. The ultrasound images may be 2-D, 3-D, or a combination of both. The navigation computer 36 may process the images in near real-time to determine states of the objects. The ultrasound imaging device may have any suitable configuration and may be different than the camera unit 46 as shown in FIG. 2.

In another example, the navigation system 32 and/or localizer 44 are radio frequency (RF)-based. For example, the navigation system 32 may comprise an RF transceiver coupled to the navigation computer 36. The end effector 20 and the patient (P) may comprise RF emitters or transponders attached thereto. The RF emitters or transponders may be passive or actively energized. The RF transceiver transmits an RF tracking signal and generates state signals to the navigation computer 36 based on RF signals received from the RF emitters. The navigation computer 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52, 54, 56 as shown in FIG. 2.

In yet another example, the navigation system 32 and/or localizer 44 are electromagnetically (EM) based. For example, the navigation system 32 may comprise an EM transceiver coupled to the navigation computer 36. The end effector 20 and the patient (P) may comprise EM components attached thereto, such as any suitable magnetic tracker, electromagnetic tracker, inductive tracker, or the like. The trackers may be passive or actively energized. The EM transceiver generates an EM field and generates state signals to the navigation computer 36 based upon EM signals received from the trackers. The navigation computer 36 may analyze the received EM signals to associate relative states thereto. Again, such navigation system 32 examples may have structural configurations that are different than the navigation system 32 configuration as shown throughout the Figures.

Based on the tracker data, the navigation system 32 tracks states of the end effector 20 relative to the target site (e.g., bone) of the patient, both of which may move during the surgical procedure. A process is performed wherein the target site (e.g., bone surface) is registered relative to a coordinate system of its respective tracker such that the navigation system 32 knows the state of the target site. Planning data (e.g., preoperative or intraoperative images of the patient) relating to the target site is utilized in conjunction with registration such that the robotic device (RD) can be controlled relative to the target site. Anatomical registration can occur according to various techniques. In one technique, a pointer is tracked by the navigation system 32 and the pointer is utilized to touch points on the surface of the bone. In another example, anatomical registration occurs by imaging the target site using, e.g., a fluoroscopic imaging apparatus. Registration may also occur according to ultrasound or electromagnetic techniques.

The navigation system 32 and/or localizer 44 may have any other suitable components or structure not specifically recited herein. Furthermore, any of the techniques, methods, and/or components described above with respect to the camera-based navigation system 32 shown throughout the Figures may be implemented or provided for any of the other examples of the navigation system 32 described herein. For example, the navigation system 32 may utilize solely inertial tracking or any combination of tracking techniques.

Described herein are computer-implemented algorithms for advanced control of the robotic device (RD) to move the end effector 20 relative to virtual constraints (VC). This is realized by controlling the joints of the robotic device (RD). The speed of the robotic device (RD) can be controlled as well. By using DoF of the robotic device (RD), the frequency of the on/off switching of the tool power is eliminated.

Virtual constraints (VC) may be generic, patient specific, arbitrarily shaped (convex, concave), open volumes or closed volumes. The virtual constraints (VC) may be set pre- or intraoperatively using an interactive planning software. The virtual constraints (VC) can be cutting boundaries that delineate portions of an anatomy that should be removed (e.g., to receive an implant) from portions of the anatomy that should be protected. By tracking the anatomy of the patient (P), and by virtue of anatomical registration, the system 24 can associate the virtual constraint (VC) with the target site such that as the target site moves, so does the virtual constraint (VC). In turn, the end effector 20 can engage the target site within the boundary of the virtual constraint (VC). Alternatively, the virtual constraints (VC) can be defined relative to areas that do not involve the patient (P), such as areas in the workspace of the robotic device (RD) that the robotic device (RD) should avoid to prevent collisions, etc. In other examples, the virtual constraint (VC) can be utilized to guide the end effector 20 to a location, such as a start location for milling or sawing. Any number of virtual constraints (VC) can be utilized with the techniques described herein.

Figure 3:
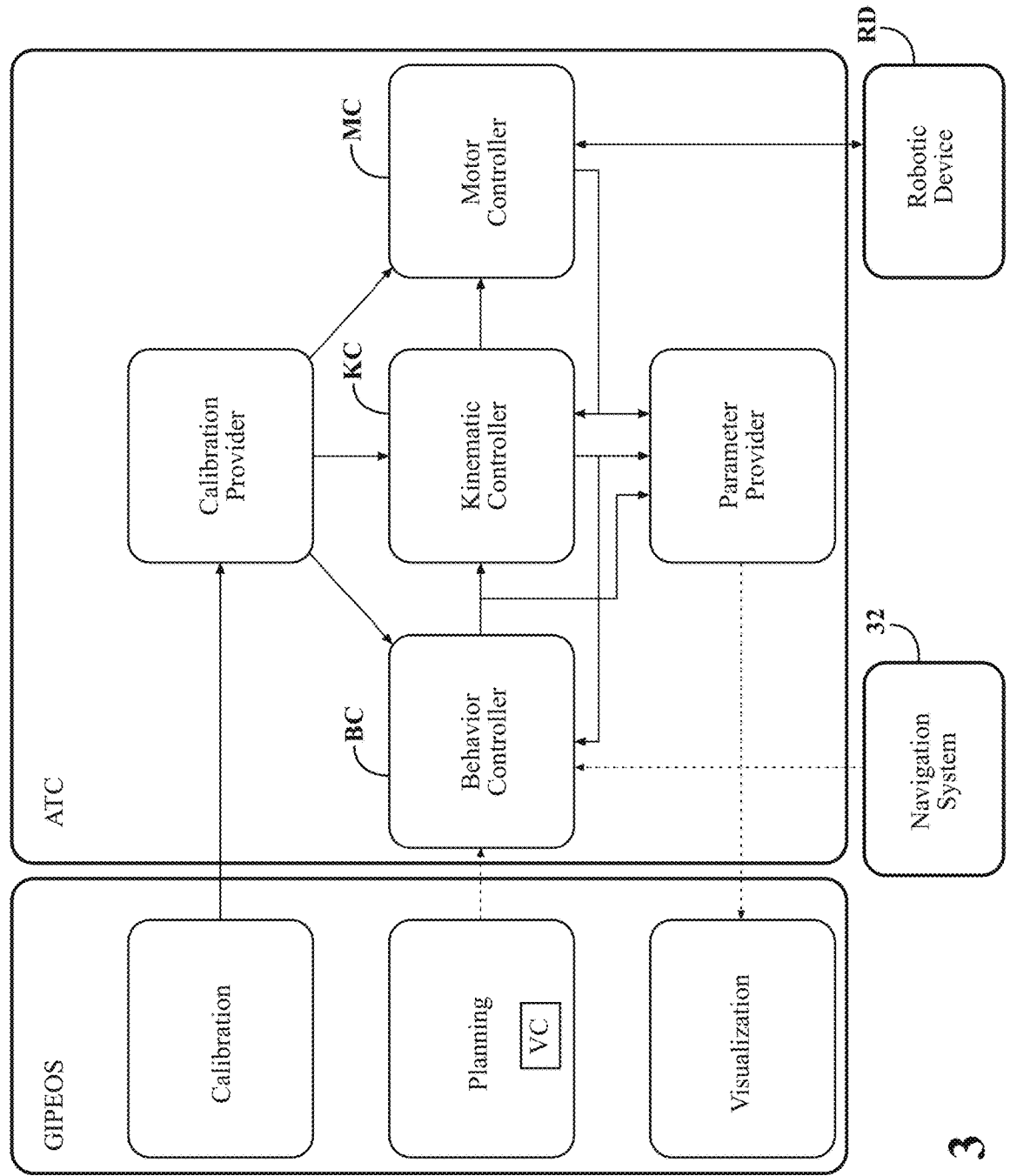
FIG. 3 is a block diagram of an example software system that may be used with the control system.

Referring now to FIG. 3, the system 24 may include a robotic control system 28. In FIG. 3, a block diagram illustrates an example of a software system that may be used with the control system 28. The control system 28 includes software and/or hardware for directing the motion of the robotic device (RD). The robotic control system 28 directs the motion of the robotic device (RD) and controls an orientation of the end effector 20 during the surgical procedure. The control system 28 may be located in the navigation system 32, in the robotic device (RD) and/or in a manipulator controller located in the robotic cart. The navigation and manipulator controllers may form the control system 28.

The control system 28 may be executed on one or more computing devices comprising one or more controllers configured to provide output to the robotic device (RD) in a wired or wireless manner. The computing device includes at least one processor and at least one memory device. The processor may include a microprocessor, a microcontroller, or the like. The memory device is a non-transitory computer-readable storage medium that stores computer-readable and executable instructions embodied in one or more programs or modules. The memory device may include, for example, non-volatile memory such as a hard disk or flash memory, and may also include random access memory (RAM), which can include non-volatile RAM (NVRAM), magnetic RAM (MRAM), ferroelectric RAM (FeRAM), or any other suitable memory. The control system 28 may comprise one or more controllers.

The control system 28 software can comprise a Generic Intraoperative Planning and Execution of Orthopaedic Surgery (GIPEOS) for planning and visualization and the Active Tool Controller (ATC) to control the robotic device (RD).

GIPEOS may be used to generate the virtual constraints (VC) needed, to calibrate the robotic device (RD), and to show the visualizations related to the same. The GIPEOS software may enable the surgeon to plan orthopaedic surgeries intra-operatively. Subsequently, the plan may be executed. If necessary, the surgeon may switch between planning and execution as often as necessary. The planning is generic which means that the software offers different elementary objects such as points, lines and planes. Subsequently, these objects may be assembled to more complex structures. Surfaces may be recorded and modified. Distance and angle measurements may be offered. Objects may be digitized relative to other each other (snapping functionality, e.g. place perpendicular or parallel to another object). Alternatively, virtual constraints (VC) can be defined preoperatively and generically based on a selected implant model, or the like. One example of such software that can be utilized to create virtual constraints (VC) with the techniques described herein is described in U.S. application Ser. No. 15/952,810, filed Apr. 13, 2018, entitled "Surgical Systems and Methods For Facilitating Ad-Hoc Intraoperative Planning of Surgical Procedures", the entire disclosure of which is hereby incorporated by reference in its entirety.

The ATC ensures that the end effector 20 does not operate outside the virtual constraint (VC). By defining objects (planes, wedges, triangle meshes in general) the region may be constrained. In one example, the ATC may comprise a Behavior Controller (BC), a Kinematic Controller (KC) and a Motor Controller (MC), which are responsible for controlling the robotic device (RD). Additional to the controllers there may be two components for reading input data and providing data to components outside the ATC. The behavior controller (BC) is independent from the hardware and can be applied to tools with any degrees of freedom. The behavior controller (BC) may receive planning data from GIPEOS and pass the computed speed and target position to the kinematic controller (KC). The behavior controller (BC) receives the planning data and the current transformations and computes the target position as well as the end effector 20 speed. These parameters are passed to the kinematic controller (KC) that calculates the joint parameters according to a kinematic model (inverse kinematics). The kinematic model of the kinematic controller (KC) may be adapted to the hardware. These joint parameters are sent to the motor controller (MC) that communicates with the motors. Besides this forwarding pipeline there may also be one for feedback. The motor controller (MC) reads the current joint parameters and passes them to the kinematic controller (KC). The kinematic controller (KC) computes the current position and passes it to the behavior controller (BC) (forward kinematics). The motor controller (MC) updates the robotic device (RD) position. A calibration provider may import the calibrations and update the controllers. A parameter provider may collect calculated parameters and supply them to the visualization on request.

The end effector 20 can interact or collide with the virtual constraints (VC) during operation. There are different ways that the control system 28 reacts in case that the end effector 20 collides with one of these virtual constraints (VC). In one example, as long as possible, the end effector 20 will retreat in order not to intersect the virtual constraints (VC). If this is not possible anymore, the end effector's 20 power is turned off thus bringing the end effector 20 into a safe state.

Figure 4:
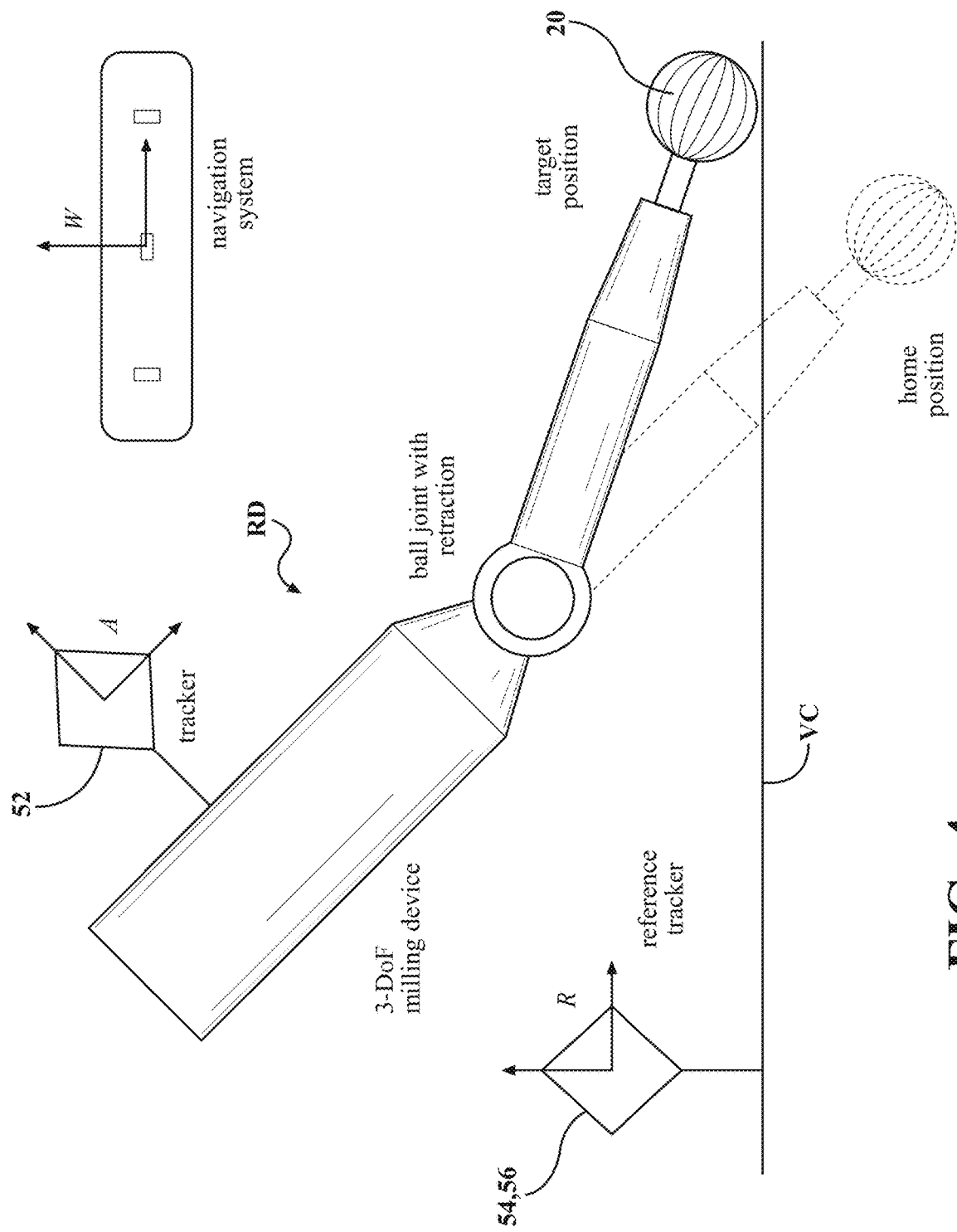
FIG. 4 illustrates a collision between a position of the robotic device with a virtual constraint and adjustment into a target position.

Referring now to FIG. 4, a side view of the robotic device (RD) of FIG. 1A is shown. Here, a collision of the end effector 20 of robotic device (RD) with the virtual constraints (VC) is illustrated. A home position is the position in which the end effector 20 is located when there are no intersecting virtual constraints (VC) or without regard to any virtual constraints (VC). In other words, the home position of the end effector 20 is the position when the robotic device 20 is in an unconstrained state. The target position is the corrected position that does not intersect the virtual constraints (VC). The robotic device 20 is controlled to adjust the end effector 20 into the target position by setting the end effector 20 position accordingly.

The home position can be defined according to various configurations and considering various factors. In one example, the home position is set based on any of the following: the mechanics and kinematics of the robotic device (RD), the position of the tracker on the robotic device (RD), the type of joints (J), the ergonomics of the robotic device (RD), the type or nature of surgical procedure or surgical site, or the like. For instance, the home position can be set as the position of the end effector 20 when all joints (J) are in their halfway position. In FIG. 4, the home position is aligned with an axis (A) of the robotic device (RD). However, if it is known that the end effector 20 will approach the virtual constraint (VC) at an angle from above, the home position can be angled off the major axis of the robotic device (RD). For example, the home position can be set to be normal to the virtual constraint (VC) (e.g., pointed straight down in FIG. 4). This way, the home position can be deliberately set to maximize anticipated collisions with the virtual constraint (VC), which in turn, increases range of motion of the end effector 20.

Figure 5:
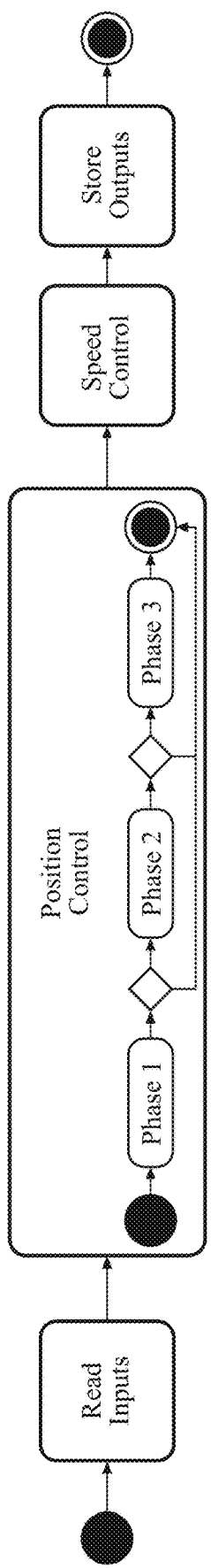
FIG. 5 is a block diagram illustrating an example of a behavior controller iteration.

Referring now to FIG. 5, a block diagram illustrates an example of an iteration of the behavior controller (BC). After the inputs are read into the behavior controller (BC), the position and speed control algorithms are executed. The position control may run one or more phases. Before the iteration is finished the outputs are stored for the next iteration. The position control algorithm can run three or more phases. k identifies the current phase with 0<k<3. Any number of phases and iterations can be employed by the techniques described herein. The number of phases can be based on considerations such as computational limits of the system, or the like.

The position control algorithms perform a collision detection to find a valid position in which the end effector 20 does not intersect any virtual constraint (VC). Additional to the forward and the inverse kinematics it may also perform plausibility checks for the reachability of a given position. The position control algorithms ensure that the computed parameters are within a range that the hardware can reach. In case that these parameters are outside the reachable range, the motor controller (MC) turns off the end effector 20.

The following sections refer to these coordinate systems: (1) the coordinate system A of the tracker attached to the robotic device (RD); (2) the coordinate system R of the reference tracker attached to the patient's bone; and (3) the coordinate system W of the navigation system 32. The units of all coordinate systems are given in millimeters.

Collision Detection Algorithm:

The collision detection component finds any collision between the end effector 20 movement and the defined virtual constraints (VC). In one example, the virtual constraint (VC) may be a surface consisting of one or more planar triangles. Alternatively, or additionally, the virtual constraint (VC) can be modeled according to geometry of any surface or shape. The virtual constraint (VC) can be modeled using a freeform surface, splines, non-uniform rational basis spline (NURBS), point clouds, or the like.

In one example, the end effector 20 is modeled as a spherical burr and the ATC expects spherical burrs. However, it will be readily understood that differently shaped burs may also be used with the collision detection algorithm. For instance, rotary tools can be modeled to have a surface of revolution about an axis, saws can be modeled as a volume that envelopes the range of oscillating motion of the saw, etc.

In one example, the control system 28 employs a discrete approach (a posteriori) whereby a collision between the end effector 20 and the virtual constraint (VC) is detected after it occurred. On the other hand, the control system 28 can employ a continuous approach (a priori) whereby the control system 28 predicts the movement of the end effector 28 and finds a collision before it occurs. In one instance, a discrete approach is used because there are two movements: the movement of the human hand and the movement of the end effector 20 (caused by the joints of the robotic device). Whereas the movement of the end effector 20 is controlled, the human movement is difficult to predict when there is only the navigation system 32 without additional sensors (tremor prediction normally uses high-speed 6-DoF gyroscopes). These sensors can be utilized as well. Therefore, a discrete approach may be used to calculate the collision for a given movement of the end effector 20. When the end effector 20 is modeled as a sphere, the convex hull of a linear sphere movement trajectory is a capsule.

Figure 6:
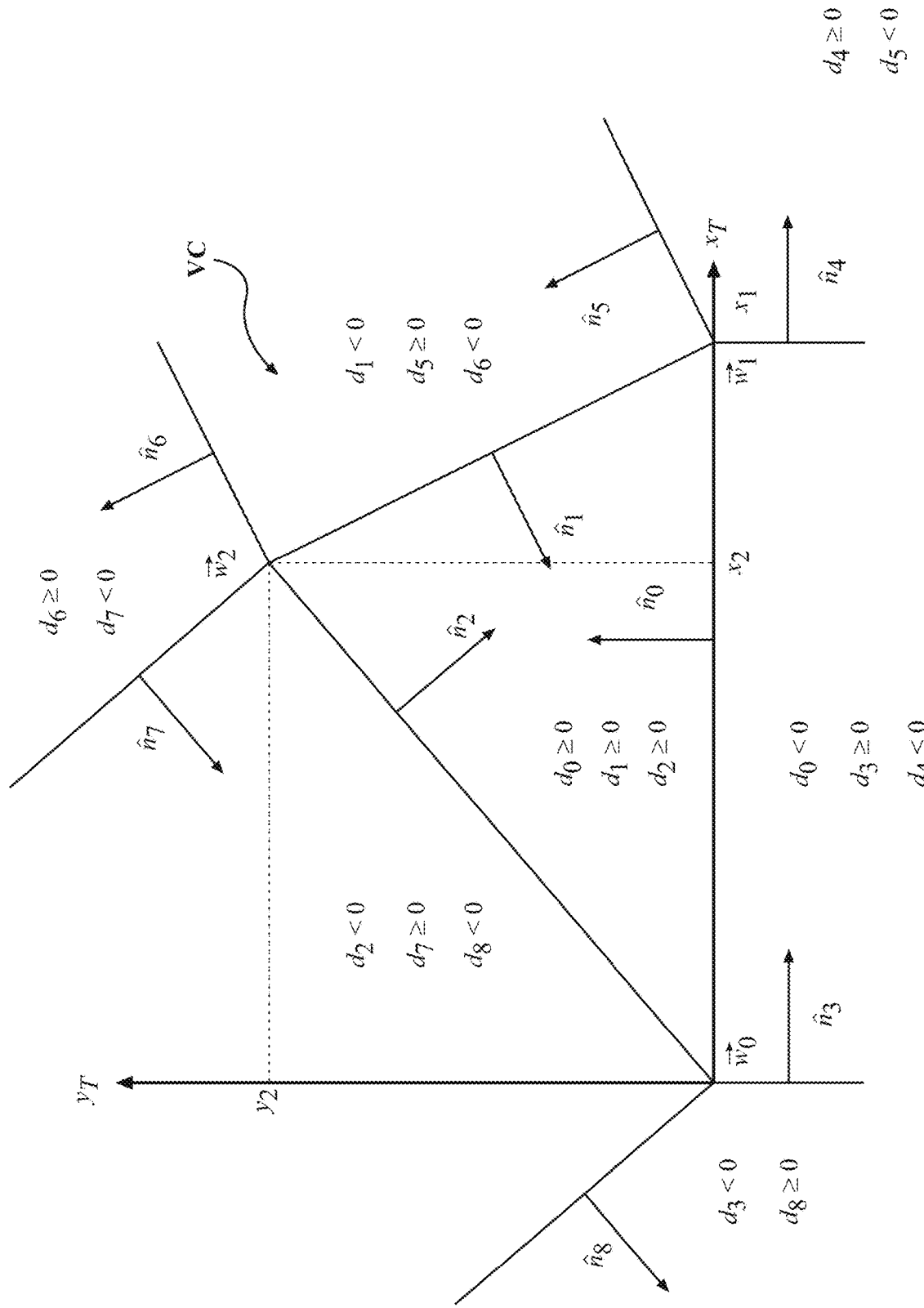
FIG. 6 is a diagram illustrating an example of an optimized base coordinate system of a capsule triangle collision algorithm.

Referring now to FIG. 6, a diagram illustrates an example of an optimized base coordinate system of a collision algorithm. Here, the virtual constraint (VC) is represented as a triangle mesh and the algorithms are optimized for finding collisions of capsules with given triangle meshes. As mentioned above, however, the virtual constraint (VC) may be modeled differently and the collision detection algorithms modified accordingly.

For simplicity and optimization, this collision detection may be performed in the virtual constraint (VC) base coordinate system T. In this coordinate system the first triangle corner coincides with the origin, the second one lies on the positive x-axis and the third one lies in the xy-plane with a positive y-coordinate. The z-coordinate is always 0, $\vec{w}_0$ and $\vec{w}_1$ lie on the x-axis and $\vec{w}_0$ is located in the origin of the coordinate system. The plane in which a triangle lies is split into seven regions by nine line segments. The lines are defined by their normals $\hat{n}_0$ to $\hat{n}_8$. The region in which a projected point $\vec{u}$ lies is indicated by the sign of the distances to the lines. If a point lies inside the triangle the distance to line 0, 1 and 2 is positive. If a point lies under line 0 the distance to line 0 and 4 is negative and the one to line 3 is positive.

Figure 7:
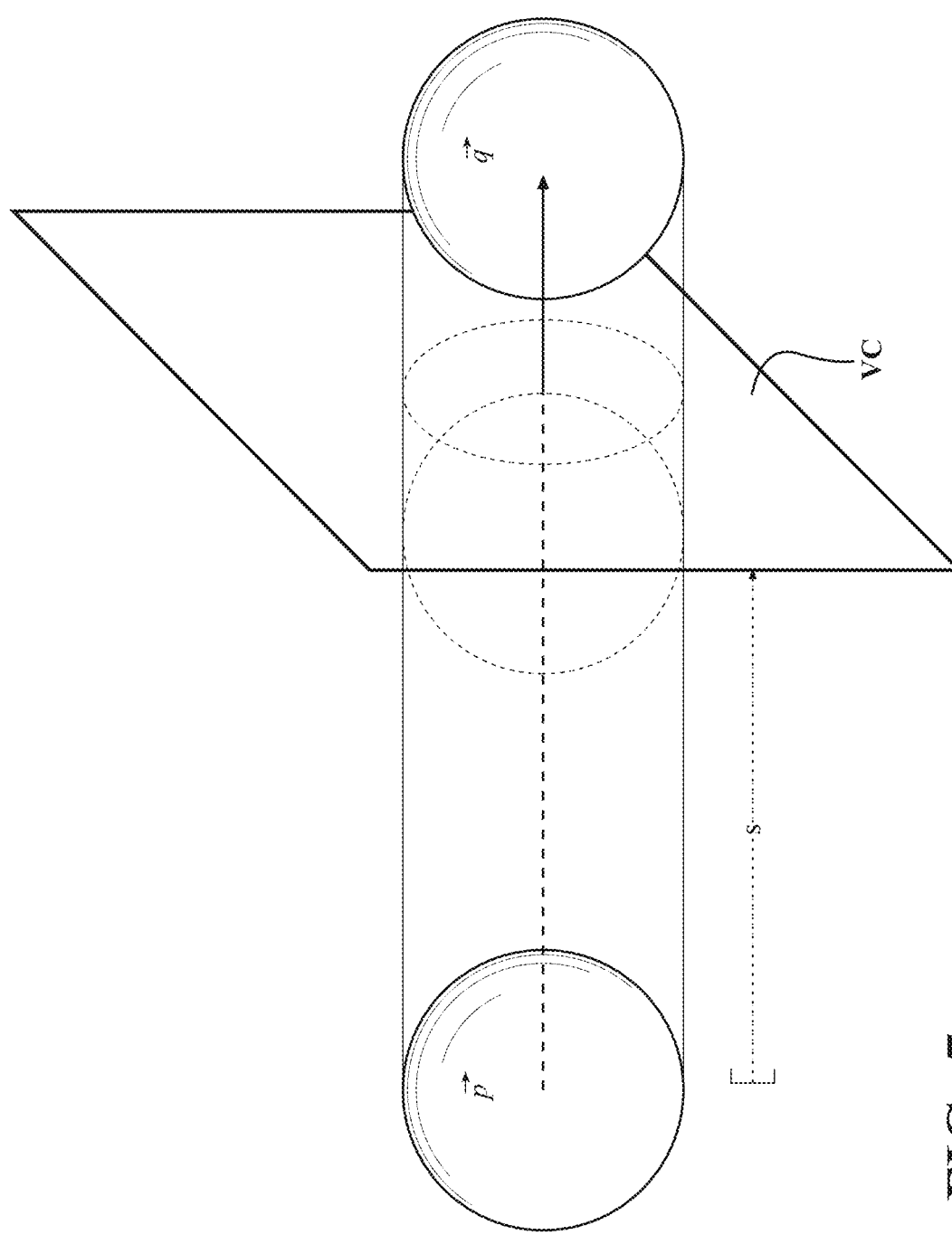
FIG. 7 is a diagram illustrating movement of the end effector relative to a virtual constraint.

Referring now to FIG. 7, a diagram illustrates sphere movement (capsule) from $\vec{p}$ to $\vec{q}$ and the factor s indicating how far the sphere can move. The sphere movement is defined by the start position $\vec{p}$ and the target position $\vec{q}$ of the sphere center. The algorithm returns a factor s that indicates how far the sphere can move from $\vec{p}$ to $\vec{q}$ until it collides with the virtual constraint (VC). The factor s is given in percent whereby 0.0 means that the sphere at position $\vec{p}$ already collides with the virtual constraint (VC) and 1.0 means that the sphere can move from $\vec{p}$ to $\vec{q}$ without intersecting the virtual constraint (VC).

Further Parameters are:

$\vec{m}$: The move vector from $\vec{p}$ to $\vec{q}$, $\vec{m} = \vec{q} - \vec{p}$ $\vec{n}$: The normal vector of the virtual constraint (VC) triangle $\vec{\iota}$: The intersection point of the sphere with the virtual constraint (VC) triangle $\vec{b}$: The "best guess" position is the position of the sphere center where it touches the virtual constraint (VC) triangle $\vec{c}$: The nearest point to $\vec{p}$ on the virtual constraint (VC) triangle $\vec{a}$: The "away vector" from $\vec{c}$ to $\vec{p}$. This vector is independent from the movement and only depends on the initial position $\vec{p}$, $\vec{a} = \vec{p} - \vec{c}$ $\vec{\eta}$: The vector from $\vec{\iota}$ to $\vec{b}$ that is called "move plane normal".

The move plane normal is called so since it defines the plane in which the sphere can move without intersecting the virtual constraint (VC). In certain cases, $\vec{\eta}$ only equals the virtual constraint (VC) normal $\vec{n}$. The move plane normal depends on the movement of the sphere.

Referring now to FIGS. 8A-8D, various examples of a sphere movement colliding with the virtual constraint (VC) are illustrated. Parameters calculated in the collision detection algorithm are shown. Note the difference between the vectors $\vec{\eta}$, $\vec{n}$ and $\vec{a}$ as well as the points $\vec{\iota}$ and $\vec{c}$.

Figure 8A:
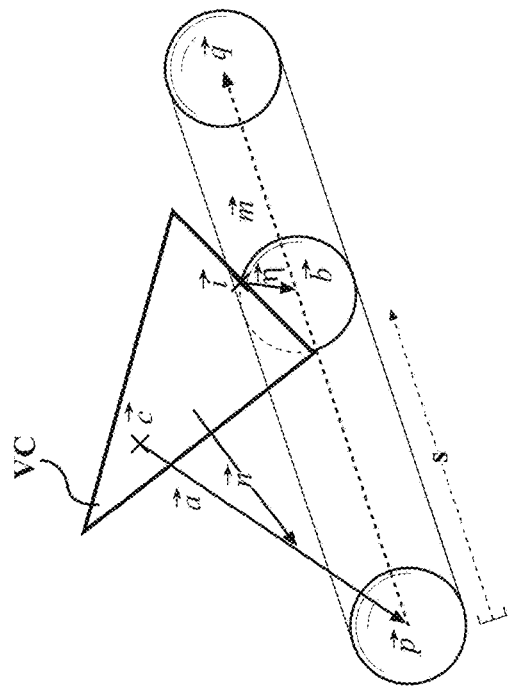
FIGS. 8A-8D illustrate various examples of a sphere movement colliding with a virtual constraint.
Figure 8C:
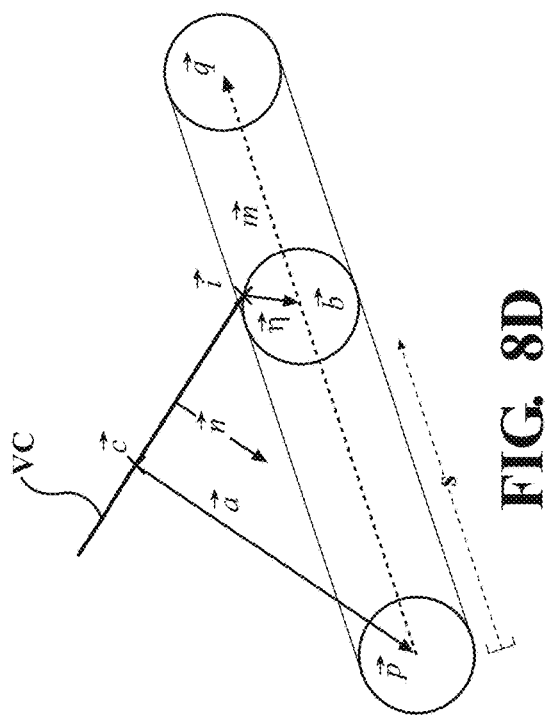
Figure 8B:
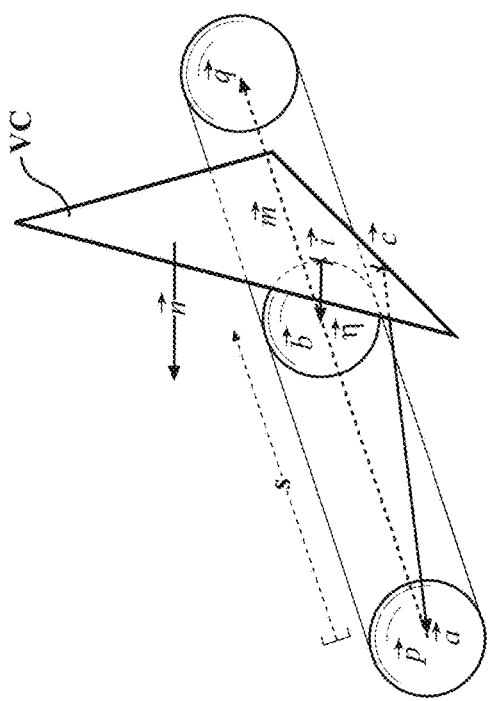
Figure 8D:
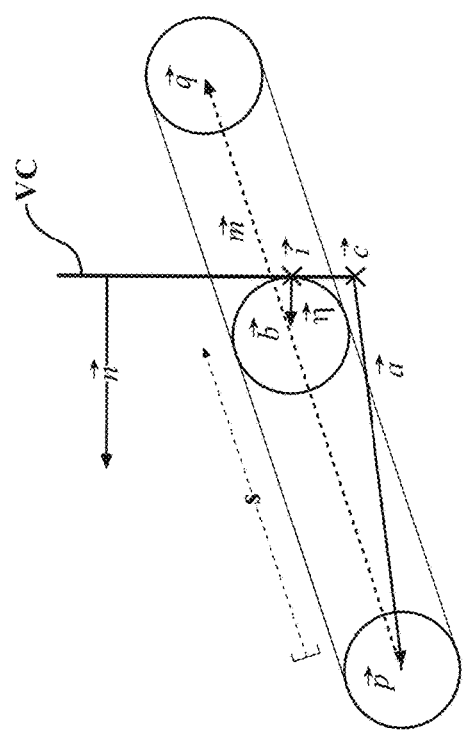

In a first example, as shown in a 3D view of FIG. 8A and a side view FIG. 8B, an intersection inside the perimeter of the virtual constraint (VC) is shown. In a second example, as shown in a 3D view of FIG. 8C and a side view FIG. 8D, an intersection on the edge of the virtual constraint (VC) is shown.

The collision detection algorithm may comprise of two parts. In one example, the nearest point on the triangle $\vec{c}$ is calculated in order to know if the movement $\vec{m}$ points towards the virtual constraint (VC). This is given if $\vec{a} \cdot \vec{m} > 0$ where $\vec{a} = \vec{p} - \vec{c}$. In case the movement points towards the virtual constraint (VC), the second part of the algorithm can be executed to find $s_{min}$ and $\vec{\eta}$.

Figure 9:
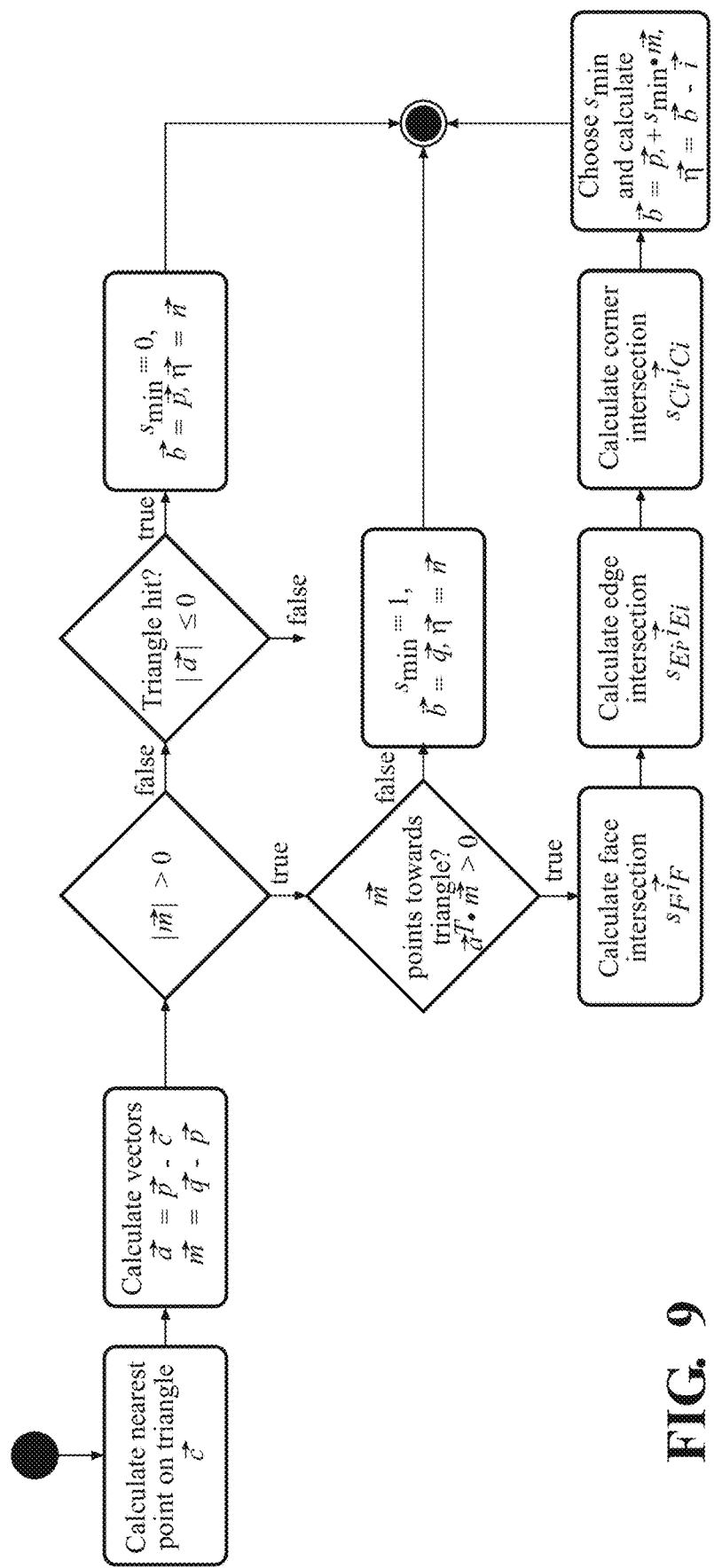
FIG. 9 is a block diagram illustrating an example collision detection algorithm.

Referring now to FIG. 9, a block diagram illustrating one version of the collision detection algorithm is shown for calculating the intersection between a capsule and virtual constraint (VC).

Nearest Point on Triangle Algorithm:

In order to calculate the nearest point to the sphere center on the virtual constraint (VC), vector $\vec{c}$, the sphere center can be transformed into base coordinates $(u_x, u_y, u_z)^T$ and dropped into the xy-plane $(u_x, u_y)^T$. Then, the control system 28 can decide in which of seven possible regions the sphere center lies, i.e., inside the triangle, perpendicular above resp. below one of the triangle sides or such that one of the triangle corners is nearest. These seven regions are defined by nine straight lines (see FIG. 6). The combination of oriented distances to these lines is represented as:

$$d_i = \hat{n}_i^T \cdot \vec{x} - c_i$$

where $\hat{n}_i$ is the unit normal vector of the line, $c_i$ the corresponding Hesse constant and $\vec{x}$ an arbitrary point in the xy-plane, can be used to determine which region is the right one. In T coordinates, this results in:

$$d_0 = y$$

$$d_1 = n_{1x} \cdot (x - x_1) + n_{1y} \cdot y$$

$$d_2 = n_{2x} \cdot x + n_{2y} \cdot y$$

$$d_3 = x$$

$$d_4 = x - x_1$$

$$d_5 = n_{1y} \cdot (x - x_1) - n_{1x} \cdot y$$

$$d_6 = n_{1y} \cdot (x - x_2) - n_{1x} \cdot (y - y_2)$$

$$d_7 = n_{2y} \cdot (x - x_2) - n_{2x} \cdot (y - y_2)$$

$$d_8 = n_{2y} \cdot x - n_{2x} \cdot y$$

FIG. 6 shows the regions and the corresponding signs of the oriented distances. Depending on the determined region, the nearest point on the triangle $\vec{c}$ is calculated:

$$(d_0 \geq 0, d_1 \geq 0, d_2 \geq 0) \rightarrow \vec{c} = (u_x, u_y, 0)^T$$

$$(d_0 < 0, d_3 \geq 0, d_4 < 0) \rightarrow \vec{c} = (u_x, 0, 0)^T$$

$$(d_4 \geq 0, d_5 < 0) \rightarrow \vec{c} = (u_1, 0, 0)^T$$

$$(d_1 < 0, d_5 \geq 0, d_6 < 0) \rightarrow \vec{c} = (u_x - d_1 n_{1x}, u_y - d_1 n_{1y}, 0)^T$$

$$(d_6 \geq 0, d_7 < 0) \rightarrow \vec{c} = (x_2, y_2, 0)^T$$

$$(d_2 < 0, d_7 \geq 0, d_8 < 0) \rightarrow \vec{c} = (u_x - d_2 n_{2x}, u_y - d_2 n_{2y}, 0)^T$$

$$(d_3 < 0, d_8 \geq 0) \rightarrow \vec{c} = (0, 0, 0)^T$$

Triangle Intersection Algorithm: The goal of this algorithm is to calculate how far the sphere can move from $\vec{p}$ to $\vec{q}$ without intersecting the virtual constraint (VC). The best guess position in which the sphere touches the virtual constraint (VC) is defined as $\vec{b}=\vec{p}+s\cdot\vec{m}$ with $\vec{m}=\vec{q}-\vec{p}$. In addition to these parameters, the move plane normal $\vec{\eta}$ is determined.

a) Surface Intersection:

Intersecting the line from $\vec{p}$ to $\vec{q}$ with the plane z=r' (with r'=r for $m_z$<0 and r'=-r otherwise) results in $$s_F = \frac{r' - p_z}{m_z}, \vec{b}_F = \vec{p} + s_F \cdot \vec{m}$$

and $\vec{\iota}_F = (b_{Fx}, b_{Fy}, 0)^T$.

b) Edge Intersection:

Let $\vec{w}_i$ and $\vec{w}_j$ be the start and end position of the currently considered triangle edge. Then the edge itself is described by $\vec{w}_i + t \cdot \vec{d}$ with $\vec{d}=\vec{w}_i-\vec{w}_j$ and $0 \le t \le 1$. In case the sphere touches the edge the distance of a point $\vec{p}+s\cdot\vec{m}$ to the edge equals r:

$$\frac{|((\vec{p} + s_E \cdot \vec{m}) - \vec{w}) \times \vec{d}|}{|\vec{d}|} = r$$

With $\vec{h}_1 = (\vec{p}-\vec{w}) \times \vec{d}$ and $\vec{h}_2 = \vec{m} \times \vec{d}$ this results in $$s_{E1,2} = \frac{-b \pm \sqrt{D}}{a}$$

with $D = b^2 - a \cdot c$, $$a = \vec{h}_2^T \cdot \vec{h}_2, b = \vec{h}_1^T \cdot \vec{h}_2, \text{ and } c = \vec{h}_1^T \cdot \vec{h}_1 - r^2 \cdot |\vec{d}|^2$$

The best guess position $\vec{b}_{E1,2}=\vec{p}+s_{E1,2}\cdot\vec{m}$ projected onto the edge $\vec{w}_i+t\cdot\vec{d}$ results in the intersection point $\vec{\iota}=\vec{w}_i+t_L\cdot\vec{d}$ with $$t_{L1,2} = \frac{\vec{d}^T \cdot (\vec{b}_{E1,2} - \vec{w}_i)}{\vec{d}^T \cdot \vec{d}}$$

c) Corner Intersection:

The distance of a corner $\vec{w}$ to a point on the line $\vec{p}+\vec{s}\cdot\vec{m}$ is $=|\vec{p}+s\cdot\vec{m}-\vec{w}|$. In case the sphere intersects with the corner this distance equals r:

$$|\vec{p}+s_c\cdot\vec{m}-\vec{w}|=r$$

With $\vec{h}=\vec{p}-\vec{w}$ this results in $$s_{C1,2} = \frac{-b \pm \sqrt{D}}{a}$$

with $D = b^2 - a \cdot c$, $$a = \vec{m}^T \cdot \vec{m}, b = \vec{m}^T \cdot \vec{h}, \text{ and } c = \vec{h}^T \cdot \vec{h} - r^2$$

The best guess is $\vec{b}_{C1,2}=\vec{p}+s_{C1,2}\cdot\vec{m}$ and the intersection point coincides with the corner point $\vec{\iota}_C=\vec{w}$.

$$s = \min\{\{s_F \mid 0 \le s_F \le 1\} \cup$$
$$\{s_E \mid 0 \le s_E \le 1 \wedge 0 \le t_L \le 1\} \cup$$
$$\{s_C \mid 0 \le s_C \le 1\}\}$$

The corresponding best guess and intersection point are chosen and the move plane normal is $\vec{\eta}=\vec{b}-\vec{\iota}$.

Position Control Algorithm: Finding and correcting the end effector 20 position to avoid collisions with virtual constraints (VC) is an elementary task of this component. As long as there is no virtual constraint (VC) close to the end effector 20 the target position $\vec{t}$ and the home position coincide. If the user holds the robotic device (RD) in such way that the home position collides with the virtual constraint (VC) the target position must be adapted to correct the condition. The distance between target and home position is minimized without intersecting any virtual constraint (VC). The calculated target position is saved and is used as the last valid position $\vec{l}$ in the next iteration. As utilized herein, this last valid position is referred to as the "actual position" because it is the current position of the end effector 20 at the time the system is determining where the end effector 20 should go next.

The techniques described in this section address situations wherein the control system 28 detects that the home position of the end effector 20 breaches the virtual constraint (VC) and thereafter (in a first iteration) the actual position of the end effector 20 is adjusted to a target position to avoid collision with the virtual constraint (VC). Subsequently, the home position might still be behind the virtual constraint (VC) but differs from the previous one (due to user movement). Because the home position remains behind the virtual constraint (VC), the (updated) actual position of the end effector 20 contacts the virtual constraint (VC). Since the home position remains behind the constraint (VC) in the first iteration, the end effector 20 will have a tendency to stick to the virtual constraint (VC) at the same position.

Accordingly, to mitigate this problem, the control system 28 evaluates an anticipated movement of the end effector 20 from the actual position to the home position (behind the constraint). The control system 28 detects that the anticipated movement would cause an anticipated collision between the end effector 20 and the virtual constraint 20. A subsequent target position of the end effector 20 is computed that evades the anticipated collision. The target position is spaced apart from the actual position and also contacts the virtual constraint. These subsequent iterations are executed in order to prevent the end effector 20 from sticking on the virtual constraint (VC). The one or more joints (J) of the robotic device (RD) are controlled to slide the end effector 20 from the actual position to target position along the virtual constraint (VC). In one example, the control occurs until the distance between the home position $\vec{r}$ and the actual position $\vec{l}$ is minimized.

When the end effector 20 is modeled as a sphere, the actual position, home position and target positions can also be based on the sphere model. For example, these positions can be based on the outer surface of the sphere, a center of the sphere, or the like.

Furthermore, after the first iteration, wherein the actual position of the end effector 20 contacts the virtual constraint (VC), the actual position may, in practice, be an intersection between the sphere and the virtual constraint (VC) due to the fast movement of the robotic device (RD) by the operator. The intersection may be very small (~10 s to 100 s of microns). In other examples, the actual position of the end effector 20 is positioned such that it tangentially contacts the virtual constraint (VC).

Referring now to FIGS. 10A-10D, various sphere movements are illustrated finding the target position using the position control algorithm. Four individual sphere movements $\vec{1'} \rightarrow \vec{r}$ and how the position control algorithm finds the target position $\vec{t}$ are shown. The movement ($\vec{1'} - \vec{r}$) illustrates would be the optimum without considering virtual constraints (VC). The movement ($\vec{1'} \rightarrow \vec{t}$) illustrates the final movement of the end effector 20. The movements ($\vec{1'} \rightarrow \vec{\tau}$) illustrate theoretical intermediate movements.

Figure 10A:
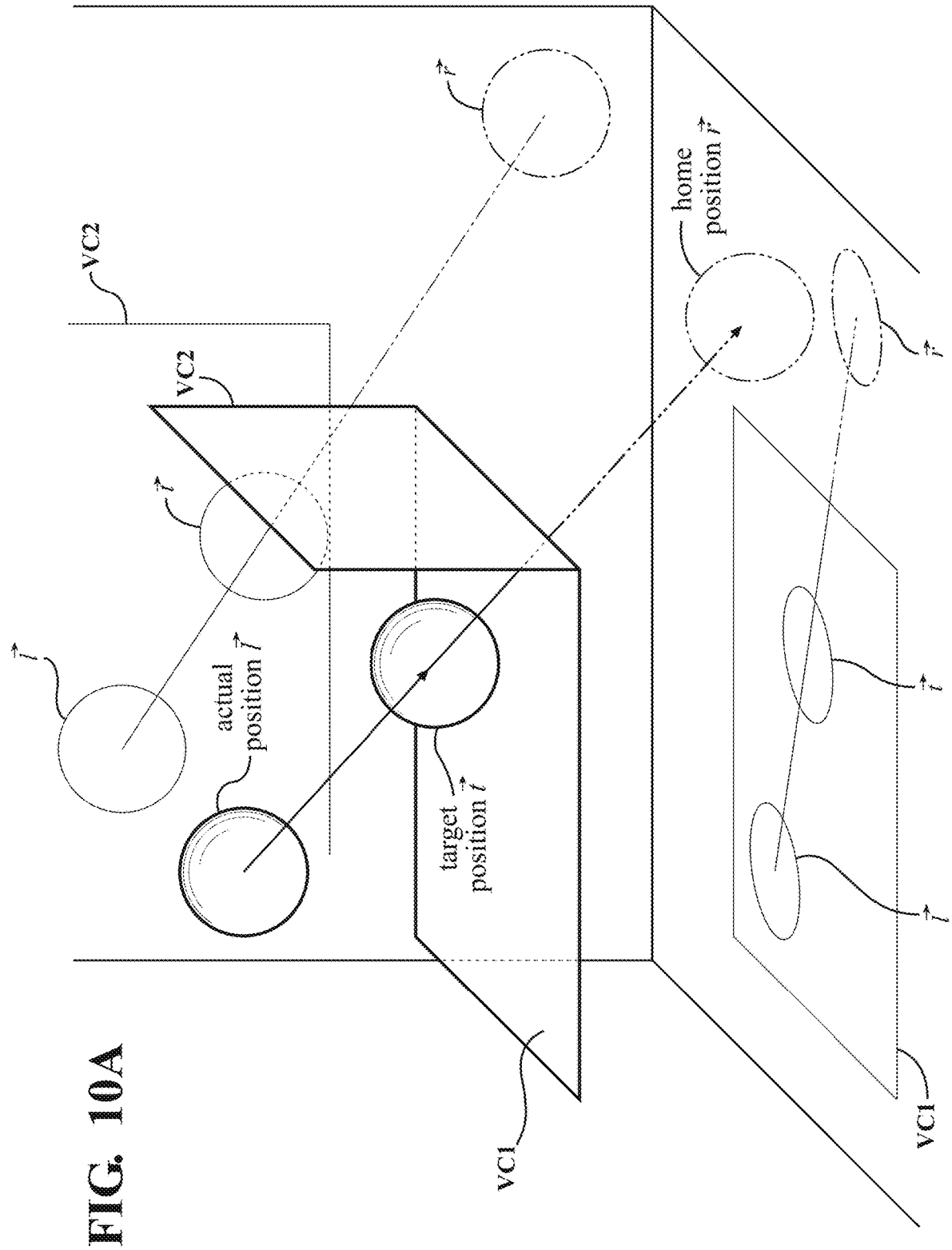
FIGS. 10A-10D illustrate different outcomes in finding a target position of the end effector given different situations wherein the end effector contacts one or more virtual constraints.
Figure 10B:
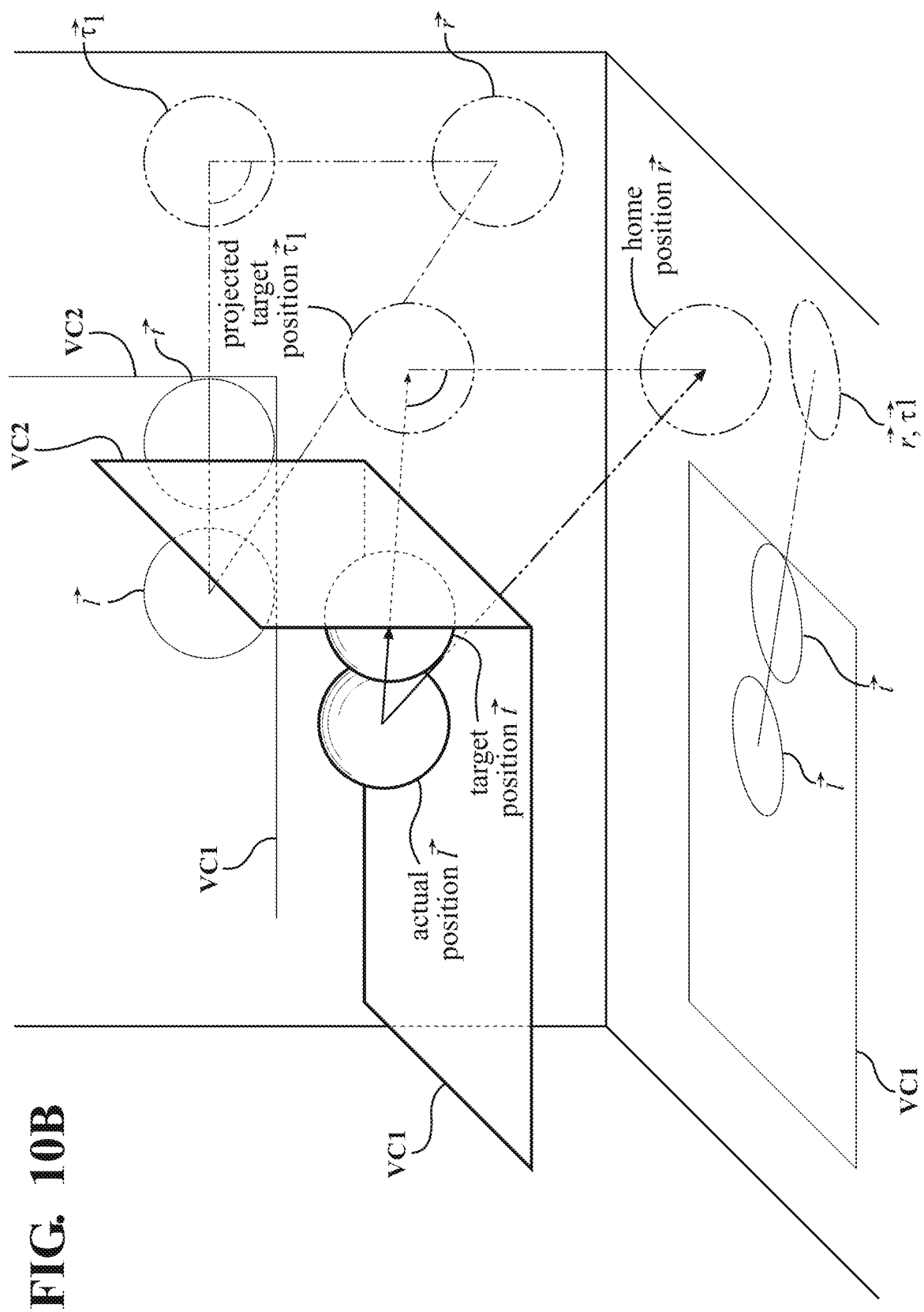
Figure 10C:
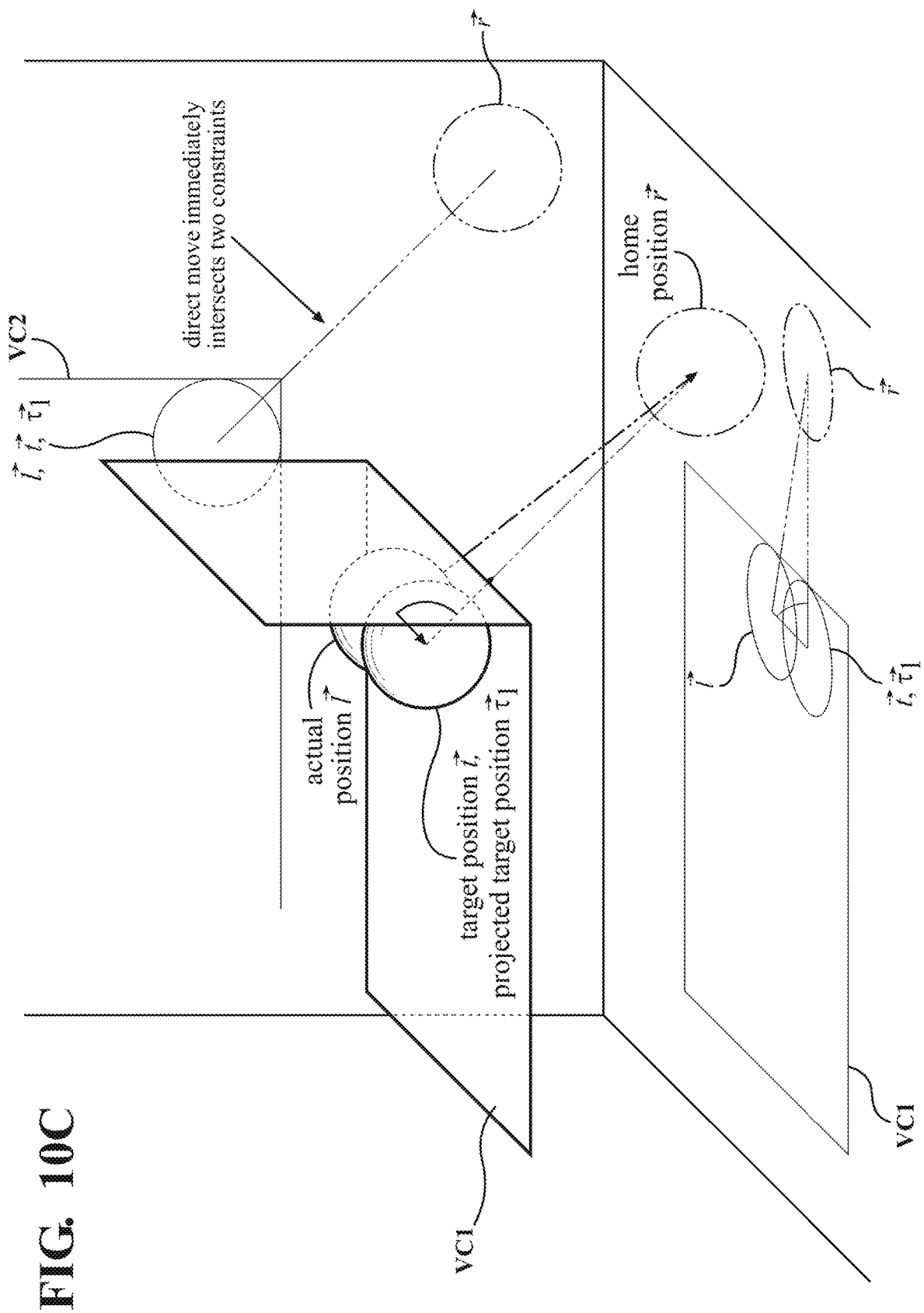
Figure 10D:
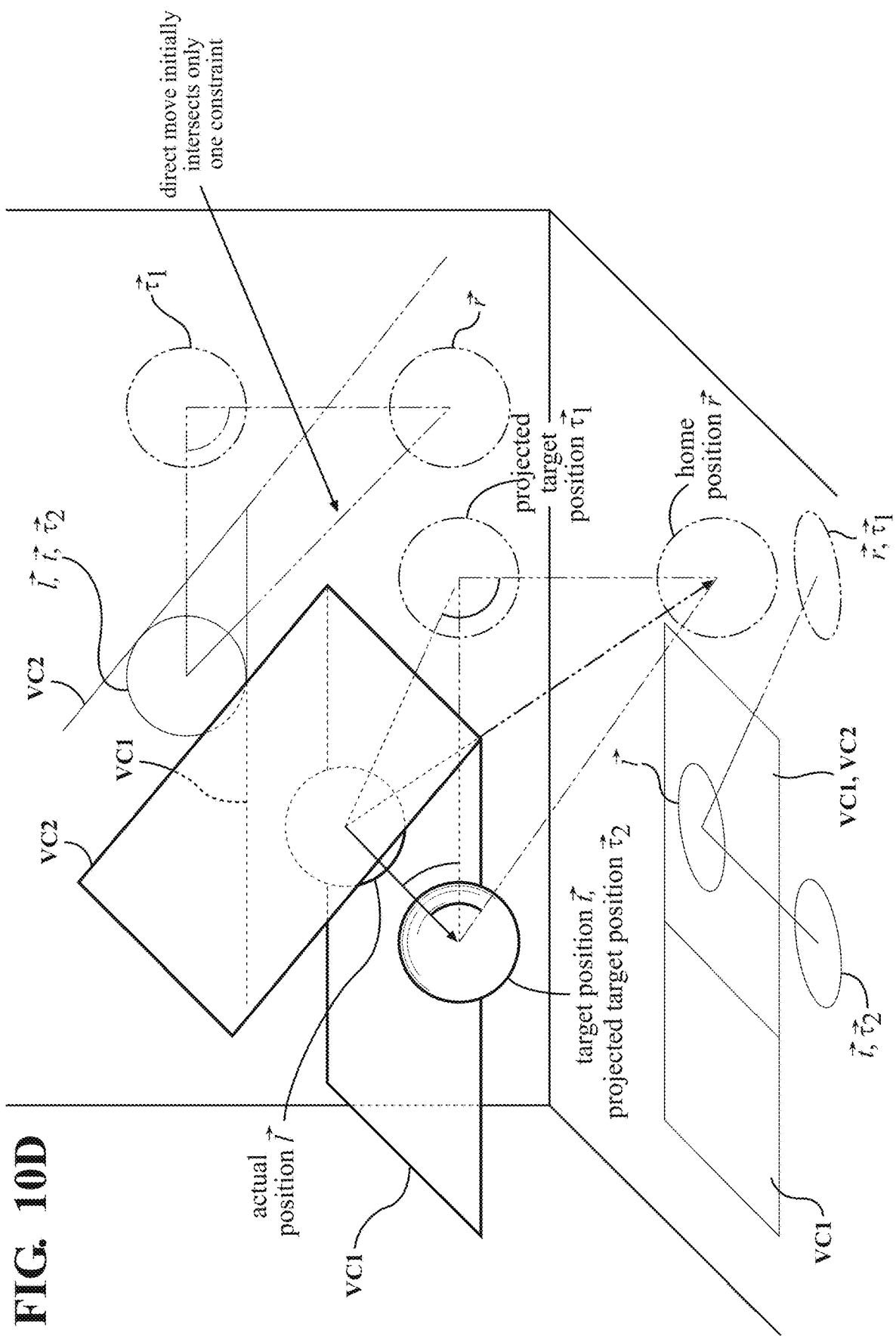

In some examples, a first virtual constraint (VC1) and a second virtual constraint (VC) are provided. The first and second virtual constraints (VC1, VC2) are connected and are each planar. In FIGS. 10A-10C, the first and second virtual constraints (VC1, VC2) are orthogonal to one another, forming a right angle corner. In FIG. 10D, the first and second virtual constraints (VC1, VC2) form an angle less than 90 degrees, e.g., about 45 degrees. Any number of connected virtual constraints (VC) can be utilized and analyzed by the techniques described herein for determining the target position of the end effector.

Referring now to FIG. 10A, showing an iteration with one phase, an example of a movement $\vec{1'} \rightarrow \vec{r}$ (actual position to home position) that collides with the virtual constraint (VC) after a certain distance is shown. In this case, the algorithm defines the target position such that the sphere touches the virtual constraint (VC1) and finishes. The end effector 20 is moved partially and on a direct path towards the home position until it reaches the target position. The end effector 20 moved to the target position, which becomes a subsequent actual position. When the end effector 20 is in the (subsequent) actual position, this is an example of the end effector 20 contacting the virtual constraint (VC1) with the home position remaining behind the constraint (VC1). Hence, absent the control algorithms described herein, the end effector 20 in FIG. 10A will stick to the same position on the virtual constraint (VC1) so long as the home position remains behind the virtual constraint (VC1).

Referring now to FIG. 10B, an iteration with two phases is shown. Here, the last valid and actual position of the end effector 20 is the target position (subsequent actual position) of FIG. 10A. Since the end effector 20 is already contacting the virtual constraint (VC1) and the home position remains behind the virtual constraint (VC1), direct movement to the home position is prohibited. Hence, a collision is detected between the actual position and the home position and a second phase is started. The actual position $\vec{1'}$ touches one of the virtual constraints (VC1). The movement $\vec{1'} \rightarrow \vec{r}$ only intersects the virtual constraint (VC1) that the actual position $\vec{1'}$ already touches. Since the movement collides, the home position $\vec{r}$ is projected onto the intersecting virtual constraint (VC1). The projected point is called projected target position $\vec{\tau}$. This projection is necessary as otherwise the end effector 20 would stick on the spot where it first touched the virtual constraint (VC1) until the home position would be above the virtual constraint (VC1) again. Due to this new movement $\vec{1'} \rightarrow \vec{\tau}$ would intersect the second virtual constraint (VC2), another collision is detected. The target position is moved away from the actual position to enable the end effector 20 to slide along the first virtual constraint (VC1) until it contacts the second virtual constraint (VC2) in the direction of $\vec{1'} \rightarrow \vec{\tau}_1$. Hence, the target position of the end effector 20 is computed to evade the anticipated collision with both the first and second virtual constraints (VC1, VC2). In the second phase, the movement $\vec{1'} \rightarrow \vec{\tau}_1$ intersects with the second virtual constraint (VC2). However, $s_{min} > 0$ which means that the latest movement can be executed partially. In one example, the target position can be calculated by $\vec{t} = \vec{1'} + s \cdot (\vec{\tau}_1 - \vec{1'})$.

Referring now to FIG. 10C, showing another iteration with two phases. Here, the last valid and actual position of the end effector 20 is the target position (subsequent actual position) of FIG. 10B. Since the end effector 20 is already contacting the virtual constraints (VC1, VC2) and the home position remains behind the virtual constraint (VC1), direct movement to the home position is prohibited in this first phase. In the second phase, the movement is projected onto the line defined by the first and second virtual constraints (VC1, VC2). More specifically, the line $\vec{1'} \rightarrow \vec{\tau}_1$ is defined from the sphere center and is parallel to the planes of the first and second virtual constraints (VC1, VC2) in a direction that slides the end effector along both virtual constraints (VC1, VC2) in the corner.

Referring now to FIG. 10D, an iteration with three phases is described. Again, the end effector 20 is already contacting the virtual constraints (VC1, VC2) and the home position remains behind the virtual constraint (VC1). Hence, direct movement to the home position is prohibited. A collision with the first virtual constraint (VC1) is detected and a second phase is started. In the second phase, movement is projected $\vec{\tau}_1$ onto the first virtual constraint (VC1) and/or the second virtual constraint (VC2). The resulting projection $\vec{1'} \rightarrow \vec{\tau}_1$ causes another collision and a third phase is started. In the third phase, movement is projected onto the line $\vec{1'} \rightarrow \vec{\tau}_2$ defined by the first and second virtual constraints (VC1, VC2). More specifically, the line $\vec{1'} \rightarrow \vec{\tau}_2$ is defined from the sphere center and is parallel to the planes of the first and second virtual constraints (VC1, VC2) in a direction that slides the end effector along both virtual constraints (VC1, VC2) in the corner. Hence, the end effector 20 evades collision and slides along the constraints to avoid sticking in position.

In one example, movements between the actual and target position can be based on smallest allowable movement, described below. In another example, the target position is defined based on a preset distance from the actual position (e.g., 1-5 mm). In another example, the end effector 20 comprises an axis (A) (FIG. 1A) and the control system 28 is configured to define the target position based on a projection parallel to the axis (A) or define the target position based on a projection perpendicular to the axis (A). In yet another example, the control system 28 defines a vector from the actual position to the home position and projects the vector onto the virtual constraint (VC) intersected by the vector. The target position is defined based on the projected vector. The target position can be defined using techniques other than those described herein.

Since the projected movement could intersect other virtual constraints (or the same constraint in other points), the collision detection has to be performed once in each phase. Performing a collision detection up to three times in one iteration guarantees that the robotic device (RD) does not execute a movement that is not previously checked against all virtual constraints (VC). This multi-phased architecture is attributed to the special nature of a robotic device (RD). In each iteration the home position and the actual position may be considered since they are moving relative to each other.

As described above, the target position is spaced apart from the actual position when there is a collision with the virtual constraint (VC). This is usually the case when the end effector 20 approaches the virtual constraint (VC) at an angle. In rare instances, continued movement $\vec{l} \rightarrow \vec{r}$ from the actual position to the home position is exactly normal to the surface of the virtual constraint (VC). In these instances, the target position may remain in the same position on the virtual constraint (VC) causing the end effector 20 to stick to the virtual constraint (VC) until the home position is angled off normal. The control system 28 may employ supplemental or alternative techniques to address this rare situation.

Figure 11:
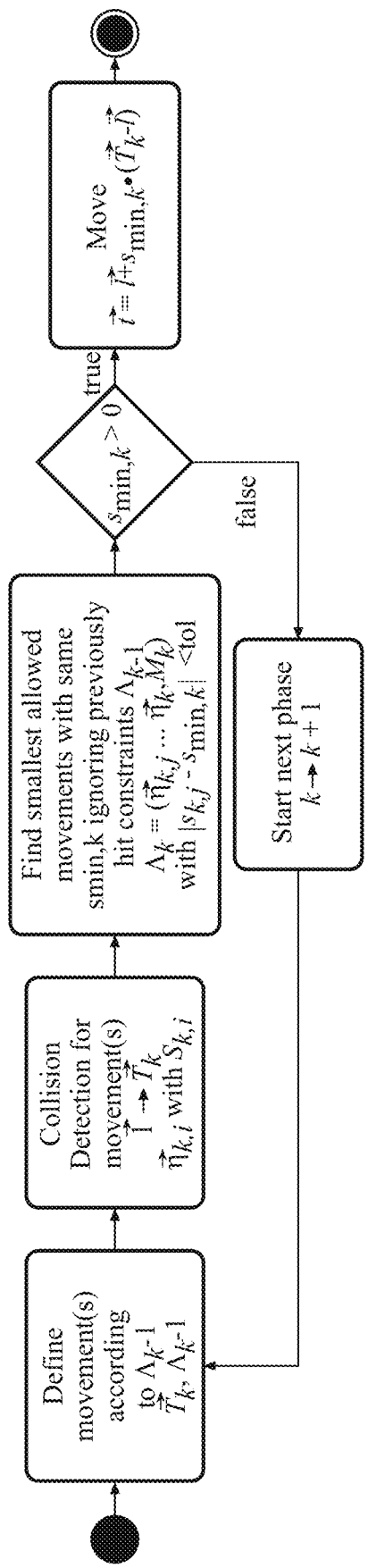
FIG. 11 is a block diagram illustrating a position control algorithm, according to one example.

Referring now to FIG. 11, a block diagram illustrating one example of the position control algorithm is shown. FIG. 11 is one particular example of the position control algorithm and the algorithm may comprise different steps other than those shown or may be characterized more broadly than shown.

In this example, inputs to the algorithm include the home position $\vec{r}$ and the actual position $\vec{l}$. The output is the target position $\vec{t}$. Every collision of the current movement from $\vec{l}$ to the projected target position $\vec{\tau}_k$ produces one pair of $\vec{\eta}_{k,i}$ with corresponding $s_{k,i}$. After the smallest allowed movement is found only the move plane normals with a s of $s_{min,k}$ are stored in $\Delta_k$. This iterative position control algorithm can be summarized in the following steps:

(1) Calculate the projected target position $\vec{\tau}_k$ according to the intersected triangles from the previous phases and the movement from $\vec{l}$ to $\vec{r}$. In the first phase $\vec{\tau}$ equals $\vec{r}$.

(2) In case the projected target position $\vec{\tau}_k$ equals the actual position $\vec{l}$ the algorithm is terminated.

(3) Otherwise, a collision detection for the sphere movement from the actual position to the projected target position $\vec{l} \rightarrow \vec{\tau}_k$ is performed.

(4) The smallest allowed movements with the same factor $s_{min}$, neglecting the triangles from the previous phases, is determined.

(5) If there is a possible movement ($s_{min} > 0$), the target position is set and the algorithm is terminated.

(6) Otherwise, start the next phase.

Move Plane Normal Versus Triangle Normal:

In one example, every intersected triangle of the virtual constraint (VC) defines a move plane normal $\vec{\eta}$ and a factors which indicates how far the end effector 20 can move from $\vec{l}$ to $\vec{\tau}_k$. The move plane normal defines the plane in which the end effector 20 is allowed to move relative to the triangle without intersecting it. Every move plane normal restricts the space in which the end effector 20 can move. If there are two different move plane normals with s=0 the space is restricted to the intersection line of the two planes defined by the move plane normals and the actual position $\vec{l}$. In this case, the end effector 20 could subsequently slide along this line. This case occurs in FIGS. 10C and 10D.

When there are three different move plane normals (all with s=0) they intersect each other in one point. This means that the end effector 20 is completely restricted. In this case the projected target $\vec{\tau}_k$ equals the actual position $\vec{l}$. One example would be a movement through the tip of a tetrahedron while touching the three faces of the tip.

The position control algorithm may use the move plane normal to compute in which direction the end effector 20 is allowed to move. The move plane normal $\vec{\eta}$ is the vector from the contact point $\vec{t}$ to the sphere center $\vec{b}$. Therefore, it is parallel the triangle's normal when the intersection point lies inside the triangle and differs when the intersection point lies on one of the triangle's edges or corners. Movement of the end effector 20 is limited to the move plane, when utilized.

Figure 12A:
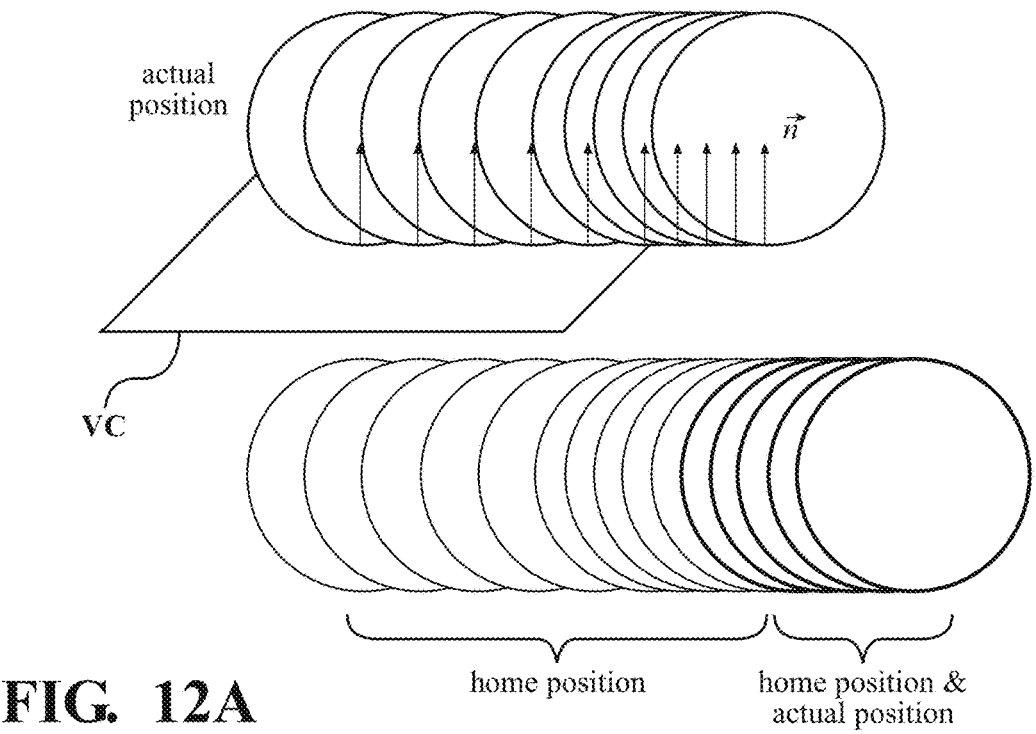
FIG. 12A illustrates end effector movement relative to the virtual constraint using a vector normal to the virtual constraint.
Figure 12B:
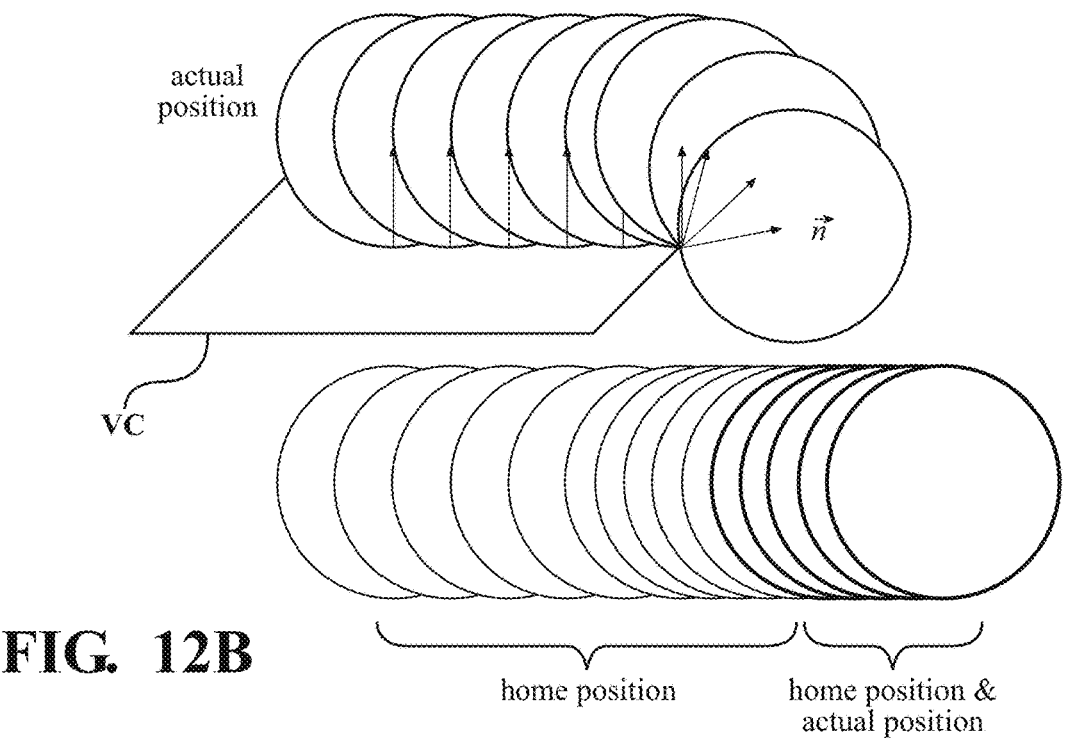
FIG. 12B illustrates end effector movement relative to the virtual constraint using a vector normal to a move plane.

Referring now to FIGS. 12A-12B, various sphere movements using the triangle's normal and the move plane normal are shown. The figures illustrate differences between using the triangle normal $\vec{n}$ (FIG. 12A) and the triangle's move plane normal $\vec{\eta}$ (FIG. 12B). When using the triangle's normal, the sphere simply continues moving according to the same height even after passing the edge of the virtual constraint (VC). When using the move plane normal, the sphere slides around the edge of the triangle once it reaches the edge of the virtual constraint (VC). This behavior may produce smoother movements around corners and edges of the virtual constraint (VC). Comparing FIGS. 12A and 12B, both approaches initially show the same results when the end effector 20 slides along the surface of the virtual constraint (VC). The approaches differ as soon as the sphere passes the edge of the virtual constraint (VC). $\vec{\eta}$ is the vector from the nearest point on the triangle to the sphere center. This vector defines a plane in which the sphere is allowed to move. The triangle's normal is constant. Therefore, by using the move plane normal, the sphere moves around the edge, whereas in case of the triangle normal, the sphere continues straight until it can pass the triangle without intersection.

Finding the Smallest Allowed Movement:

The control system 28 can identify a direction within the plane that results in the least amount of movement for the end effector 20 relative to the actual position and compute the target position based on the identified direction and the least amount of movement.

In one example, the collision detection algorithm returns a move plane normal $\vec{\eta}_{k,i}$ with corresponding factor $s_{k,i}$ for every collision (with $0 \leq i < C_k$). Different triangles can be intersected at different distances. Considering only the closest collisions, the control system 28 searches for move plane normals corresponding to the smallest allowed movement defined by $s_{min,k}$. It is possible that several triangles can be intersected at the same distance. Hence, the result of this search is a matrix:

$$\Delta_k = (\vec{\eta}_{k,0} \ldots \vec{\eta}_{k,M_{k-1}}) \text{ with } M_k \leq C_k$$

containing the move plane normals corresponding to $s_{min,k}$. Moreover, the hit triangles from the previous phase, represented by $\Delta_{k-1}$, may be ignored since they are implicitly included in the projected movement (the projection was calculated according to the previous triangles). In the first phase there are no previous triangles.

Defining the Movement:

Eventually the case occurs that $\vec{l} \to \vec{\tau}_k$ collides with a virtual constraint (VC). If $s_{min} > 0$, the algorithm calculates the target position $\vec{t} = \vec{l} + s_{min} (\vec{\tau}_k - \vec{l})$ and finishes the iteration (see FIG. 10A). If $s_{min} = 0$ the end effector 20 cannot move on the given movement direction and the next phase is started.

Figure 13:
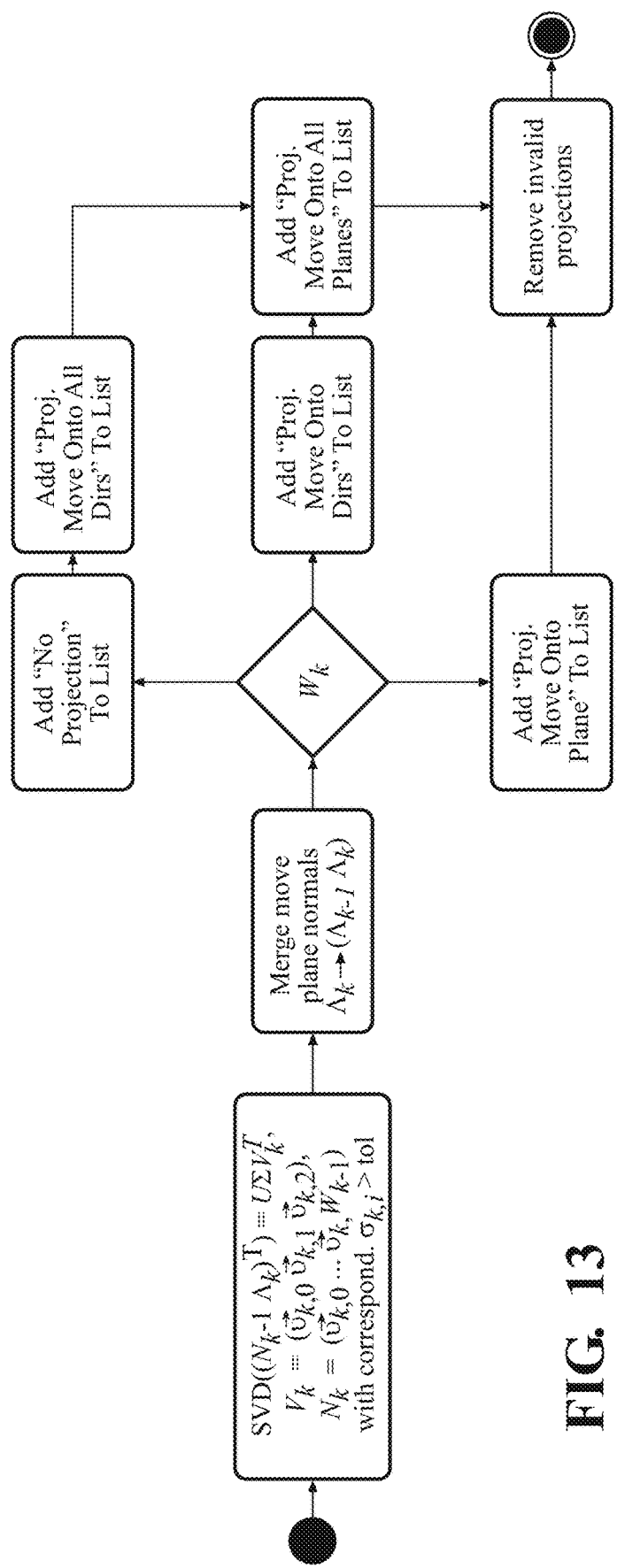
FIG. 13 is a block diagram illustrating one example of a projection algorithm that defines the movements according to the given restrictions.

Projection Algorithm:

As mentioned above the current move vector $\vec{l}$ to $\vec{r}$ can be projected onto planes, lines, or points depending on the found virtual constraints (VC). Referring now to FIG. 13, a block diagram illustrating one example of a projection algorithm is shown. The projection algorithm defines the movements according to the given restrictions as shown. To provide greater clarity, the indices are incremented by 1. Inputs are the right-singular vectors $N_{k-1}$ and the move plane normals $\Delta_k$ as well as the movement from the actual position $\vec{l}$ to the home position $\vec{r}$. The output is a list of possible projected target positions $\{\tau_{k+1,\gamma}\}$ with corresponding move plane normals $\Delta_{k,\gamma}$. The projection algorithm of FIG. 13 is one particular example. The projection algorithm can be characterized differently and more broadly than that described in FIG. 13.

Before calculating the projection, the control system 28 determines how restricted the space already is. This determination depends on the current phase.

In the first phase, k=0, the space is not yet restricted, therefore there is no projection necessary: $\vec{\tau}_k = \vec{r}$ In the second phase, k=1, the space is restricted by the move plane normals found in the first phase $\Delta_0 = (\vec{\eta}_{0,0} \ldots \vec{\eta}_{0,M_{o-1}})$. In order to find the vector space defined by the move plane normals a singular value decomposition (SVD) is applied:

$$SVD((\vec{\eta}_{0,0} \ldots \vec{\eta}_{0,M_{0-1}})^T) = U_0 \underset{0}{\Sigma} V_0$$

$$\underset{0}{\Sigma} = \begin{pmatrix} \sigma_{0,0} & 0 & 0 \\ 0 & \sigma_{0,1} & 0 \\ 0 & 0 & \sigma_{0,2} \\ 0 & 0 & 0 \\ \vdots & \vdots & \vdots \\ 0 & 0 & 0 \end{pmatrix}$$

$$V_0 = (\vec{v}_{0,0} \quad \vec{v}_{0,1} \quad \vec{v}_{0,2})$$

Matrix $V_0$ is a 3×3 matrix whose column vectors are the right-singular vectors of $\Delta_0$. Each right-singular vector $\vec{v}_{0,i}$ is assigned to one singular value $\sigma_{0,i}$, i=0, 1, 2. The vectors that belong to non-zero singular values define how the movement will be restricted. They are stored in matrix $N_0 = (\vec{v}_{0,0} \ldots \vec{v}_{0,W_{o-1}})$ with $\vec{W}_0$ being the number of non-zero singular values $\sigma_{0,i}$.

The vectors of $N_0$ can form three different restrictions with three different projections ($\vec{m} = \vec{r} - \vec{l}$ and k=0):

(1) There is one right-singular vector $\vec{v}_{k,0}$ with $\sigma_{k,0} > 0$ that defines a plane onto which the move vector is projected (see FIG. 10B)

$$\vec{\tau}_{k+1} = \vec{r} - \frac{\vec{m}^T \cdot \vec{v}_{k,0}}{\vec{v}_{k,0}^T \cdot \vec{v}_{k,0}} \cdot \vec{v}_{k,0}$$

(2) There are two right-singular vectors $\vec{v}_{k,0}$ and $\vec{v}_{k,1}$ with $\sigma_{k,i} > 0$ that define a line onto which the move vector is projected (see FIG. 9c)

$$\vec{\tau}_{k+1} = \vec{l} - \frac{\vec{m}^T \cdot \vec{d}}{\vec{d}^T \cdot \vec{d}} \cdot \vec{d} \text{ with } \vec{d} = \vec{v}_{k,0} \times \vec{v}_{k,1}$$

(3) There are three right-singular vectors with $\sigma_{k,i} > 0$ that define a point, the move vector is $\vec{0}$ $$\vec{\tau}_{K+1} = \vec{l}$$

The third phase, k=2, is similar to the second one. Additional to the move plane normals from the second phase $\Delta_1 = (\vec{\eta}_{1,0} \ldots \vec{\eta}_{1,M_{l-1}})$ the right-singular vectors from the first phase $N_0$ are used as inputs for the SVD:

$$SVD((\vec{\eta}_{1,0} \ldots \vec{\eta}_{1,M_{l-1}} \vec{v}_{0,0} \ldots \vec{v}_{0,W_{o-1}})^T) = U_1 \Sigma_1 V_1^T$$

Since the vectors belonging to non-zero singular values $N_1$ are the result of the singular value decomposition of matrix $(N_0 \Delta_1)$, they implicitly contain the vectors of matrix $\Delta_1$. Therefore, the vectors of $N_1$ can form just two different restrictions with two different projections ($\vec{m} = \vec{r} - \vec{l}$ and k=1):

(1) There are two right-singular vectors $\vec{v}_{k,0}$ and $\vec{v}_{k,1}$ with $\sigma_{k,i} > 0$ that define a line onto which the move vector is projected (see FIG. 10D).

(2) There are three right-singular vectors with $\sigma_{k,i} > 0$ that define a point, the move vector is $\vec{0}$. The move plane normals from the previous phase $\Delta_0$ are added to the current ones $\Delta_1$.

Figure 14A:
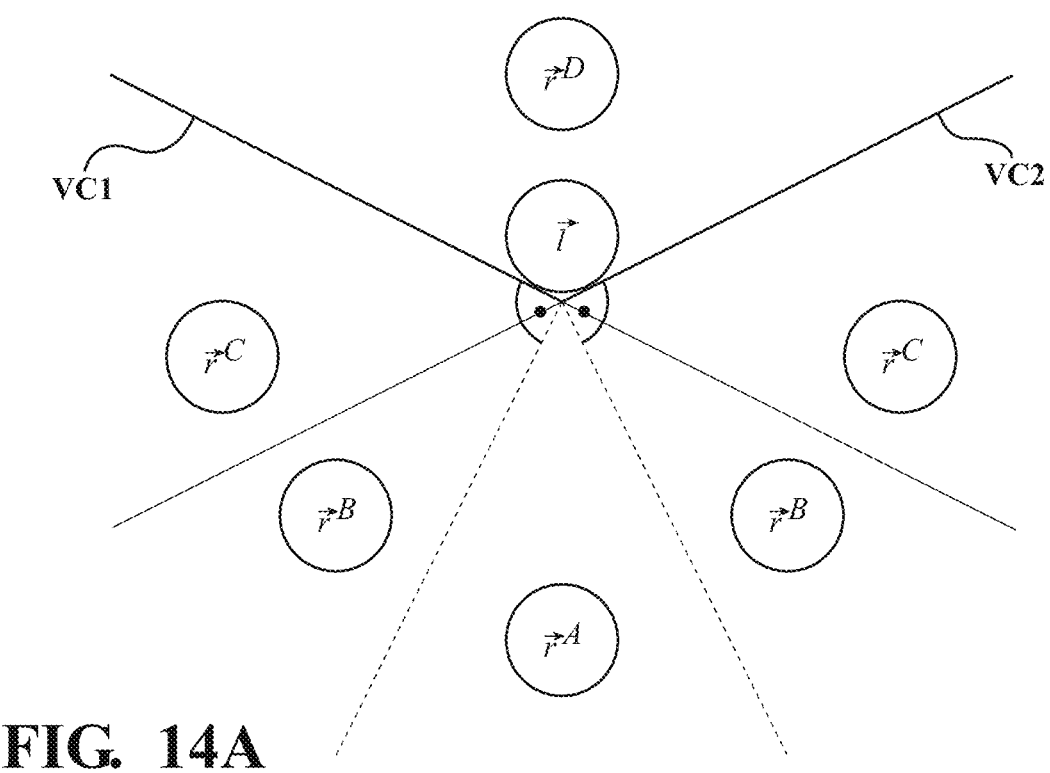
FIGS. 14A-14B illustrate a technique of checking various projections onto the individual constraints when two different constraints are intersected.
Figure 14B:
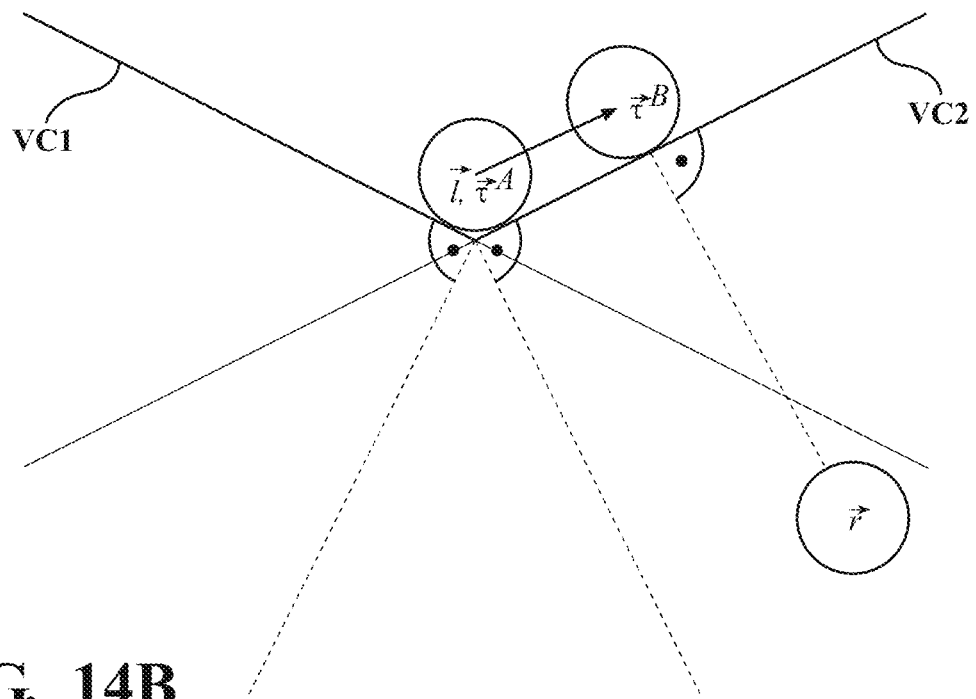

Special Projection Cases:

Referring now to FIGS. 14A-14B, various projections are illustrated. FIG. 14A shows all possibilities of various projections according to one example. Two virtual constraints (VC1, VC2) are touched by the actual position $\vec{l}$ of the end effector 20. The shown home positions $\vec{r}^A, \ldots, \vec{r}^D$ result in different projections. $\vec{l} \to \vec{r}^D$ represents a movement away from the virtual constraints (VC1, VC2), therefore, no projection is necessary. Movement $\vec{l} \to \vec{r}^C$ intersects only one of the two virtual constraints (VC1 or VC2) at a time, and the movement is projected onto the plane defined by the one virtual constraint (VC). Movement $\vec{l} \to \vec{r}^A$ intersects both virtual constraints (VC1, VC2) and therefore has to be projected onto the line defined by both virtual constraints (VC1, VC2). Movement $\vec{l} \to \vec{r}^B$ also causes a collision with both virtual constraints (VC1, VC2). However, the movement $\vec{l} \to \vec{r}^B$ can be projected onto one of the two virtual constraints (VC1 or VC2) and the resulting move vector does not collide with any of the two. Therefore, the projections may be checked onto the individual virtual constraints (VC1, VC2) even when two different virtual constraints (VC) are intersected. FIG. 14B shows an example where $\vec{\tau}^A$ is $\vec{r}$ projected onto the line, $\vec{\tau}^B$ is $\vec{r}$ projected onto the plane (prefer $\vec{\tau}^B$ to $\vec{\tau}^A$).

Additionally, valid projections exist that are calculated by using the move plane normal, which may be preferred in some situations. In the example of FIG. 14, two planes define a projection onto a line. Certain home positions cause different projections. The movement $\vec{l} \to \vec{r}^B$ may be handled differently than the movement $\vec{l} \to \vec{r}^A$ because the end effector 20 may stick onto the line even the user indicated by his movement that he wants to slide the end effector 20 along the virtual constraints (VC). The same applies in three dimensions. Instead of projecting onto a line, in some instances it may be preferable to project the movement onto one of the two planes defining the line.

As explained above the number of right-singular vectors in $N_{k-1}$ indicates how to project. Additional to the standard cases from the previous section, different movement projections are calculated and added to a list of possible projections:

(1) If there are two right-singular vectors, the movement can be projected onto the virtual constraints (VC) themselves (the move plane normals $\vec{\eta}$ of the virtual constraints (VC) are retrieved from $\Delta_{k-1}$).

2) If there are three right-singular vectors, the movement $\vec{l} \to \vec{r}$ is projected onto all possible lines calculated by combining the move plane normals $\vec{\eta}$ in $\Delta_{k-1}$. As in the previous case, the movement is also projected onto all virtual constraints (VC). Now there is a list of possible projections that may be tested against all move plane normals in $\Delta_{k-1}$. Invalid ones may be removed from the list. A projection may be invalid if the angle between the move plane normal and the projected movement is >90° where 90° is a parallel movement to the plane defined by the move plane normal. An angle<90° means that the movement points away from the plane defined by the move plane normal. It may be preferable to check several possibilities in the collision detection and choose the possibility with the longest allowed movement.

Burr Speed Control Algorithm:

The speed controller determines the speed of the end effector 20 depending on the feedback of the kinematic controller (KC). As long as the robotic device (RD) can deflect/evade the virtual constraint (VC), the speed may be set. As soon as one of the joints (J) reached its maximum, the speed may be set to 0. The burr speed may depend on the target position defined according to the techniques herein and can be varied depending on factors, such as the distance between the actual and target positions, etc.

To test the algorithms presented herein, a xyz-linear stage system was used in place of an robotic device (RD). The system comprised four linear stages driven by three motors and an orthopaedic milling device mounted on the end effector 20. Four translation stages driven by three motors were utilized. The communication between the motors and the PC was realized via CAN. A milling device was be used that allows the surgeon to easily exchange the end effector 20.

The calibration of the translational system comprised of three steps:

(1) Homing the translation stages
(2) Calibration of the transformation $F_{CA}$ from tracker coordinates A to linear stages coordinates C
(3) Pivoting of the end effector 20 to find the home position $\vec{r}_A$ The homing of the device finds its maximum deflection and its center position (home position). Since the tracker coordinates A do not coincide with the axes orientation of the system, the transformation $F_{CA}$ between coordinate system A to C is found. In this example, the reference tracker may be rigidly attached to the tool shaft, whereas the tool tracker stays untouched. The tool shaft is moved to the maximum deflection in all three directions while recording the poses of the trackers ($F_{WR}$, $F_{WA}$). This results in 3× N transformations where N is the number of recorded transformation per axes. The transformation from the reference tracker to the end effector 20 tracker is calculated by $F_{AR} = F_{WA}^{-1} \cdot F_{WR}$. The origin is extracted from these transformations. For all three records the extracted origins are used to calculate a regression line. The three calculated directions are part of the rotation matrix from A and C. The translation is zero. Finally, the end effector 20 is pivoted to find the home position $\vec{R}_A$. During the pivoting calibration the end effector 20 is placed in a tracked mold. The user rotates the tool while keeping the end effector 20 in the mold. After the calibration, the end effector 20 position can be calculated from the recorded transformations. As a last step, its radius may be specified manually. In order to calibrate the radius (or the shape) of the end effector 20, an optical calibration may be applied.

Three different geometries were milled to illustrate the accuracy of the system, using a rigid mode versus an evasive mode. The evasive mode employs the position control techniques described herein whereas the rigid mode does not. For these tests, a burr with a radius of 2.5 mm was used to mill a cuboid (30 mm×30 mm×15 mm) and a half-sphere (radius=15 mm).

Figure 15A:
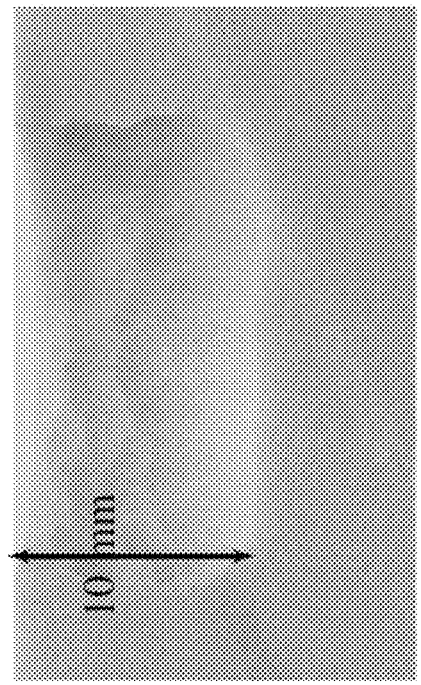
FIGS. 15A-15D show material milled with a burr to illustrate the result of using a rigid mode versus an evasive mode employed by the techniques described herein.
Figure 15B:
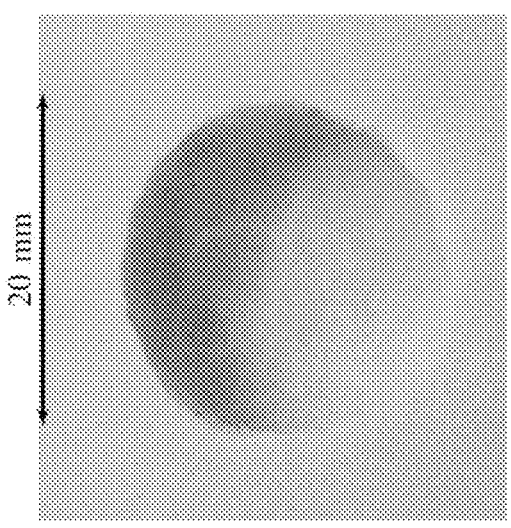
Figure 15C:
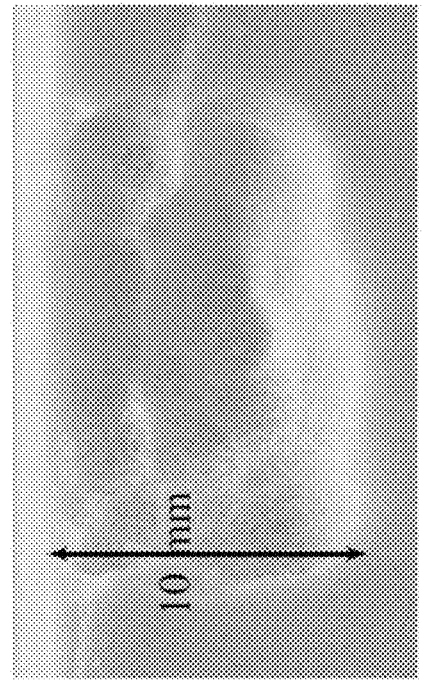
Figure 15D:
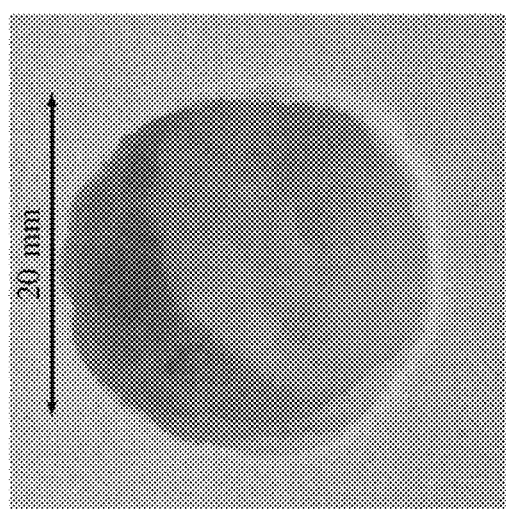

Referring now to FIGS. 15A-15D, views of a cylinder milled with a 6 mm burr are shown to illustrate the result of using the rigid mode versus the evasive mode. FIG. 15A shows a top view of a milled cylinder using the evasive mode. FIG. 15B shows a cross-sectional view of FIG. 15A. FIG. 15C shows a top view of a milled cylinder using the rigid mode. FIG. 15D shows a cross-sectional view of FIG. 15C.

Figure 16B:
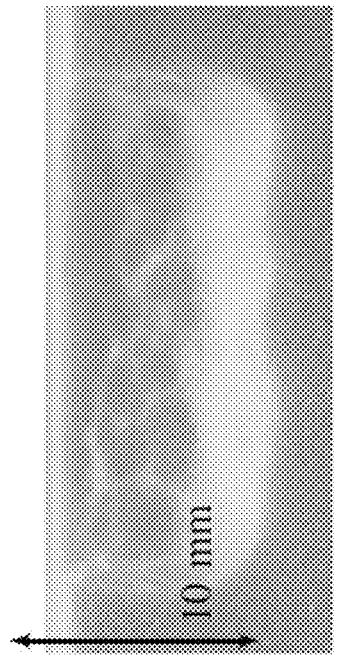
FIGS. 16A-16D show material milled with a burr to illustrate the result of using the rigid mode versus the evasive mode.
Figure 16D:
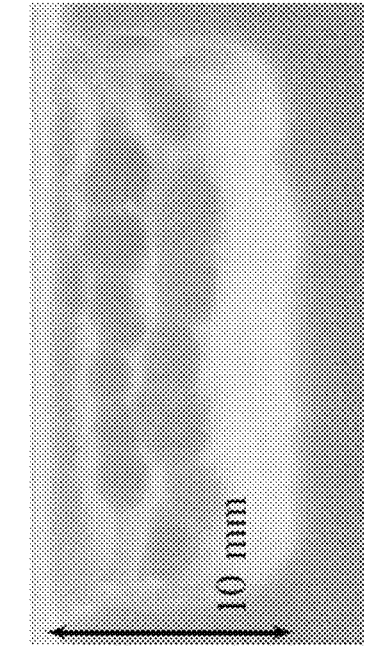
Figure 16A:
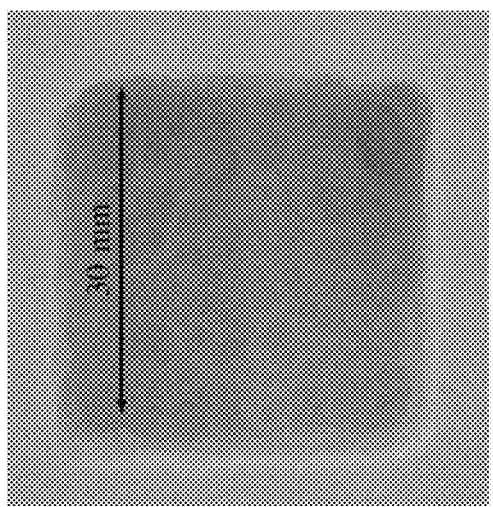
Figure 16C:
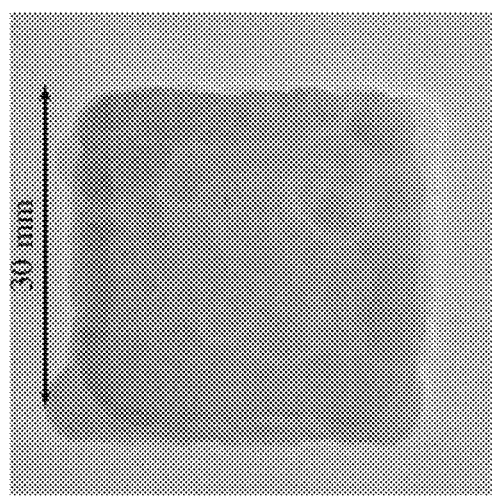

In another example, in FIGS. 16A-16D, views of a cuboid milled with a 6 mm burr are shown to illustrate the result of using a rigid mode versus an evasive mode. FIG. 16A shows a top view of a milled cylinder using the evasive mode. FIG. 16B shows a cross-sectional view of FIG. 16A. FIG. 16C shows a top view of a milled cylinder using the rigid mode. FIG. 15D shows a cross-sectional view of FIG. 16C.

Whereas the rigid mode produced ragged/frayed edges and surfaces, the evasive mode produced clearer edges and smoother surfaces. The rigid mode causes cratered surfaces. The results show that the evasive mode is more accurate than the rigid mode. The results using the evasive mode could be even further improved with another mode that allows the end effector 20 to oscillate around its home position. This mode still evades from the virtual constraints (VC) but additionally moves around the position defined by the user. The milling speed of the device has a strong influence on the accuracy of the rigid mode. The higher the speed, the more accurate the results. Additionally, a semi-autonomous mode could further shorten the milling time. The user/surgeon moves the end effector 20 close to the milling volume and the tool starts to remove the bone material in its working volume.

As shown by the results, the presented control algorithms produce similar results as stationary robots and improved results over conventional manual interventions. The control algorithms work robustly and accurately on a stationary milling device.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a robotic device comprising an end effector and one or more joints to position the end effector in a plurality of degrees of freedom;
a navigation system configured to track an actual position of the end effector; and
one or more controllers configured to:
identify a condition wherein the actual position of the end effector has been constrained by a virtual constraint;
determine a home position of the end effector, the home position is a position the end effector would be located without regard to the virtual constraint;
evaluate an anticipated movement of the end effector from the actual position to the home position;
detect that the anticipated movement would cause an anticipated collision between the end effector and the virtual constraint;
compute a target position of the end effector that evades the anticipated collision, wherein the target position is spaced apart from the actual position and located along the virtual constraint; and
control the one or more joints of the robotic device to slide the end effector from the actual position to target position along the virtual constraint.

2. The system of claim 1, wherein the virtual constraint is a first virtual constraint and further comprising a second virtual constraint that is connected to the first virtual constraint, wherein the first and second virtual constraints are each planar, and wherein the second virtual constraint is angled relative to the first virtual constraint.

3. The system of claim 2, wherein the one or more controllers are further configured to:
identify a condition wherein the actual position of the end effector has also been constrained by the second virtual constraint;
detect that the anticipated movement would also cause an anticipated collision between the end effector and the second virtual constraint; and
compute the target position of the end effector that evades the anticipated collision, wherein the target position is spaced apart from the actual position and located along the second virtual constraint.

4. The system of claim 1, wherein:
the end effector is further defined as a burr; and
the one or more controllers are further configured to model the end effector as a sphere and define the actual position, home position and target positions based on the sphere model.

5. The system of claim 4, wherein the one or more controllers are further configured to:
define a contact point between the sphere model and the virtual constraint;
define a vector between the contact point and a center of the sphere, the vector being normal to the virtual constraint;
define a plane based on the vector;
limit movement of the end effector to the plane;
identify a direction within the plane that results in the least amount of movement for the end effector relative to the actual position; and
compute the target position based on the identified direction and the least amount of movement.

6. The system of claim 4, wherein the one or more controllers detect that the anticipated movement would cause the anticipated collision by further being configured to:
define the anticipated movement by a vector defined from a center of the sphere to a point on the virtual constraint that is nearest to the center of the sphere; and
compute how far the sphere can move along the vector without intersecting the virtual constraint.

7. The system of claim 1, wherein the one or more controllers are further configured to:
define a vector from the actual position to the home position;
project the vector onto the virtual constraint; and
define the target position based on the projected vector.

8. The system of claim 1, wherein the end effector comprises an axis and the one or more controllers are further configured to:
define the target position based on a projection parallel to the axis; or
define the target position based on a projection perpendicular to the axis.

9. The system of claim 1, wherein the one or more controllers are further configured to define the target position based on a preset distance from the actual position.

10. The system of claim 1, wherein the navigation system is configured to track a target site, and wherein the one or more controllers are configured to register the virtual constraint to the target site.

11. The system of claim 1, wherein the robotic device is adapted to be held freely in the hand of an operator.

12. The system of claim 1, wherein the robotic device is configured to position the end effector in three degrees of freedom.

13. A method of operating a system comprising a robotic device including an end effector and one or more joints to position the end effector in a plurality of degrees of freedom, a navigation system configured to track an actual position of the end effector, and one or more controllers configured to perform the steps of:
identifying a condition wherein the actual position of the end effector has been constrained by a virtual constraint;

determining a home position of the end effector, the home position is a position the end effector would be located without regard to the virtual constraint;

evaluating an anticipated movement of the end effector from the actual position to the home position;

detecting that the anticipated movement would cause an anticipated collision between the end effector and the virtual constraint;

computing a target position of the end effector that evades the anticipated collision, wherein the target position is spaced apart from the actual position and located along the virtual constraint; and controlling the one or more joints of the robotic device to slide the end effector from the actual position to target position along the virtual constraint.

14. The method of claim 13, wherein the virtual constraint is a first virtual constraint and further comprising a second virtual constraint that is connected to the first virtual constraint, wherein the first and second virtual constraints are each planar, and wherein the second virtual constraint is angled relative to the first virtual constraint.

15. The method of claim 14, further comprising the one or more controllers:
identifying a condition wherein the actual position of the end effector has also been constrained by the second virtual constraint;
detecting that the anticipated movement would also cause an anticipated collision between the end effector and the second virtual constraint; and
computing the target position of the end effector that evades the anticipated collision, wherein the target position is spaced apart from the actual position and located along also contacts the second virtual constraint.

16. The method of claim 13, wherein the end effector is further defined as a burr and further comprising the one or more controllers:
modelling the end effector as a sphere; and
defining the actual position, home position and target positions based on the sphere model.

17. The method of claim 16, further comprising the one or more controllers:
defining a contact point between the sphere model and the virtual constraint;
defining a vector between the contact point and a center of the sphere, the vector being normal to the virtual constraint;
defining a plane based on the vector;
limiting movement of the end effector to the plane;
identifying a direction within the plane that results in the least amount of movement for the end effector relative to the actual position; and
computing the target position based on the identified direction and the least amount of movement.

18. The method of claim 16, wherein detecting that the anticipated movement would cause the anticipated collision further comprising the one or more controllers:
defining the anticipated movement by a vector defined from a center of the sphere to a point on the virtual constraint that is nearest to the center of the sphere; and
computing how far the sphere can move along the vector without intersecting the virtual constraint.

19. The method of claim 13, further comprising the one or more controllers:
defining a vector from the actual position to the home position;
projecting the vector onto the virtual constraint; and
defining the target position based on the projected vector.

20. The method of claim 13, wherein the end effector comprises an axis and further comprising the one or more controllers:
defining the target position based on a projection parallel to the axis; or
defining the target position based on a projection perpendicular to the axis.

21. The method of claim 13, wherein the navigation system is configured to track a target site, and further comprising the one or more controllers registering the virtual constraint to the target site.

\* \* \* \* \*